United States Patent
Kubo et al.

(10) Patent No.: US 9,906,676 B2
(45) Date of Patent: Feb. 27, 2018

(54) IMAGE PROCESSING APPARATUS AND IMAGE PROCESSING METHOD

(71) Applicant: CANON KABUSHIKI KAISHA, Tokyo (JP)

(72) Inventors: Hideki Kubo, Kawasaki (JP); Takahiro Suzuki, Tokyo (JP); Akira Shibasaki, Soka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 40 days.

(21) Appl. No.: 15/069,669

(22) Filed: Mar. 14, 2016

(65) Prior Publication Data
US 2016/0286069 A1    Sep. 29, 2016

(30) Foreign Application Priority Data

Mar. 26, 2015  (JP) ................................ 2015-064527
Jul. 2, 2015   (JP) ................................ 2015-133864

(51) Int. Cl.
| | | |
|---|---|---|
| *G06K 9/00* | (2006.01) | |
| *H04N 1/04* | (2006.01) | |
| *H04N 1/54* | (2006.01) | |
| *H04N 1/60* | (2006.01) | |
| *H04N 1/028* | (2006.01) | |

(52) U.S. Cl.
CPC .............. *H04N 1/04* (2013.01); *H04N 1/028* (2013.01); *H04N 1/54* (2013.01); *H04N 1/6072* (2013.01)

(58) Field of Classification Search
CPC ............ H04N 1/028; H04N 1/04; H04N 1/54; H04N 1/6072
See application file for complete search history.

(56) References Cited

U.S. PATENT DOCUMENTS

| | | | |
|---|---|---|---|
| 6,434,266 B1 | 8/2002 | Kanno et al. | 382/162 |
| 7,035,454 B2 | 4/2006 | Kumada et al. | 382/162 |
| 7,116,338 B2 | 10/2006 | Fukao et al. | 345/593 |
| 7,206,094 B2 | 4/2007 | Kumada et al. | 358/1.16 |
| 7,385,739 B2 | 6/2008 | Ohga et al. | 358/518 |
| 7,623,138 B2 | 11/2009 | Fukao et al. | 345/597 |
| 7,701,465 B2 | 4/2010 | Suzuki et al. | 345/601 |
| 7,965,427 B2 | 6/2011 | Suzuki et al. | 358/518 |
| 7,983,479 B2 | 7/2011 | Suzuki et al. | 382/162 |

(Continued)

FOREIGN PATENT DOCUMENTS

| | | |
|---|---|---|
| JP | 2011-061723 | 3/2011 |
| JP | 2013-014057 | 1/2013 |
| WO | 99/30136 | 6/1999 |

OTHER PUBLICATIONS

U.S. Appl. No. 15/068,259, filed Mar. 11, 2016.
Extended European Search Report dated Jul. 29, 2016, in counterpart European Patent Application No. EP 16162236.0.

*Primary Examiner* — Phuoc Tran
(74) *Attorney, Agent, or Firm* — Fitzpatrick, Cella, Harper & Scinto

(57) ABSTRACT

An image processing apparatus obtains first information including reflective characteristics of an object to be reproduced and second information including transmissive characteristics of the object to be reproduced. Then, the image processing apparatus determines the amount of coloring material for each pixel of an image representing the object to be reproduced based on the first information and the second information.

21 Claims, 21 Drawing Sheets

(56) References Cited

U.S. PATENT DOCUMENTS

| | | | |
|---|---|---|---|
| 7,990,575 B2 | 8/2011 | Suzuki | 358/1.9 |
| 8,466,993 B2 | 6/2013 | Arai | 348/280 |
| 8,570,517 B2 | 10/2013 | Horita | 356/402 |
| 9,020,249 B2 | 4/2015 | Suzuki et al. | H04N 9/67 |
| 9,083,925 B2 | 7/2015 | Shimada et al. | H04N 1/6097 |
| 2009/0207458 A1 | 8/2009 | Doggett, III et al. | 358/3.29 |
| 2010/0253958 A1* | 10/2010 | Kagata | B41J 2/2117 358/1.9 |
| 2011/0063618 A1 | 3/2011 | Horita | 356/402 |
| 2013/0307866 A1 | 11/2013 | Arai | G09G 5/02 |
| 2014/0168253 A1 | 6/2014 | Arai et al. | G09G 5/06 |
| 2015/0062654 A1 | 3/2015 | Ono et al. | G06K 15/188 |
| 2015/0254876 A1 | 9/2015 | Arai | G06T 11/001 |

\* cited by examiner

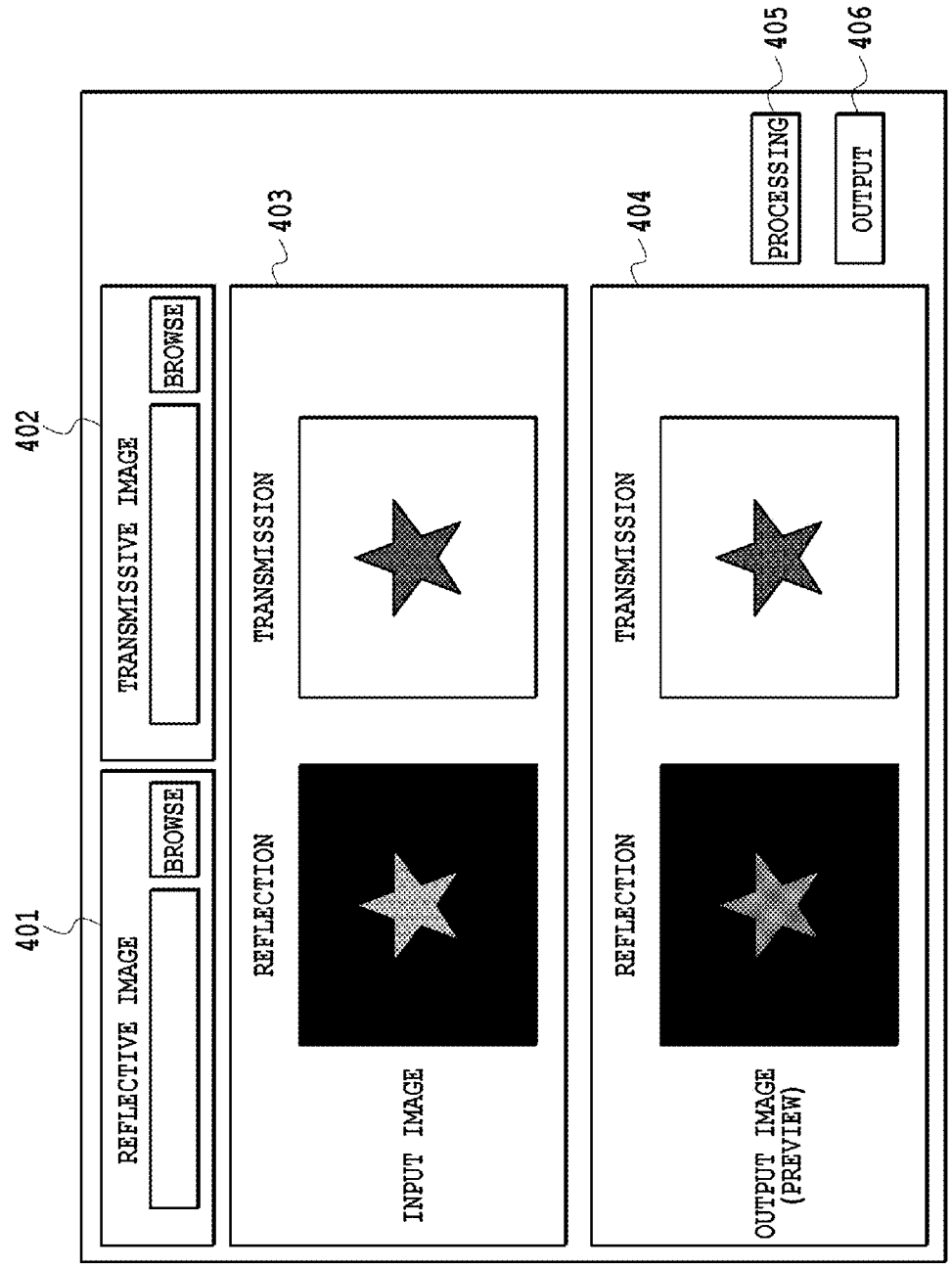

AMOUNT OF INK W1

| REFLECTION Lab | | | AMOUNTS OF COLOR INKS | | | |
|---|---|---|---|---|---|---|
| L | a | b | C | M | Y | k |
| XXX | XXX | XXX | XXX | XXX | XXX | XXX |
| XXX | XXX | XXX | XXX | XXX | XXX | XXX |
| XXX | XXX | XXX | XXX | XXX | XXX | XXX |
| ⋮ | ⋮ | ⋮ | ⋮ | ⋮ | ⋮ | ⋮ |
| XXX | XXX | XXX | XXX | XXX | XXX | XXX |
| XXX | XXX | XXX | XXX | XXX | XXX | XXX |
| ⋮ | ⋮ | ⋮ | ⋮ | ⋮ | ⋮ | ⋮ |
| XXX | XXX | XXX | XXX | XXX | XXX | XXX |
| XXX | XXX | XXX | XXX | XXX | XXX | XXX |
| ⋮ | ⋮ | ⋮ | ⋮ | ⋮ | ⋮ | ⋮ |
| XXX | XXX | XXX | XXX | XXX | XXX | XXX |
| XXX | XXX | XXX | XXX | XXX | XXX | XXX |

| REFLECTION Lab | | | TRANSMISSION Lab | | | AMOUNTS OF COLOR INKS | | | | |
|---|---|---|---|---|---|---|---|---|---|---|
| L | a | b | L | a | b | C | M | Y | k | W |
| XXX | XXX | XXX | XXX | XXX | XXX | XXX | XXX | XXX | XXX | XXX |
| XXX | XXX | XXX | XXX | XXX | XXX | XXX | XXX | XXX | XXX | XXX |
| XXX | XXX | XXX | XXX | XXX | XXX | XXX | XXX | XXX | XXX | XXX |
| . | . | . | . | . | . | . | . | . | . | . |
| . | . | . | . | . | . | . | . | . | . | . |
| XXX | XXX | XXX | XXX | XXX | XXX | XXX | XXX | XXX | XXX | XXX |
| XXX | XXX | XXX | XXX | XXX | XXX | XXX | XXX | XXX | XXX | XXX |
| . | . | . | . | . | . | . | . | . | . | . |
| . | . | . | . | . | . | . | . | . | . | . |
| XXX | XXX | XXX | XXX | XXX | XXX | XXX | XXX | XXX | XXX | XXX |
| XXX | XXX | XXX | XXX | XXX | XXX | XXX | XXX | XXX | XXX | XXX |
| . | . | . | . | . | . | . | . | . | . | . |
| . | . | . | . | . | . | . | . | . | . | . |
| XXX | XXX | XXX | XXX | XXX | XXX | XXX | XXX | XXX | XXX | XXX |
| XXX | XXX | XXX | XXX | XXX | XXX | XXX | XXX | XXX | XXX | XXX |

FIG.15

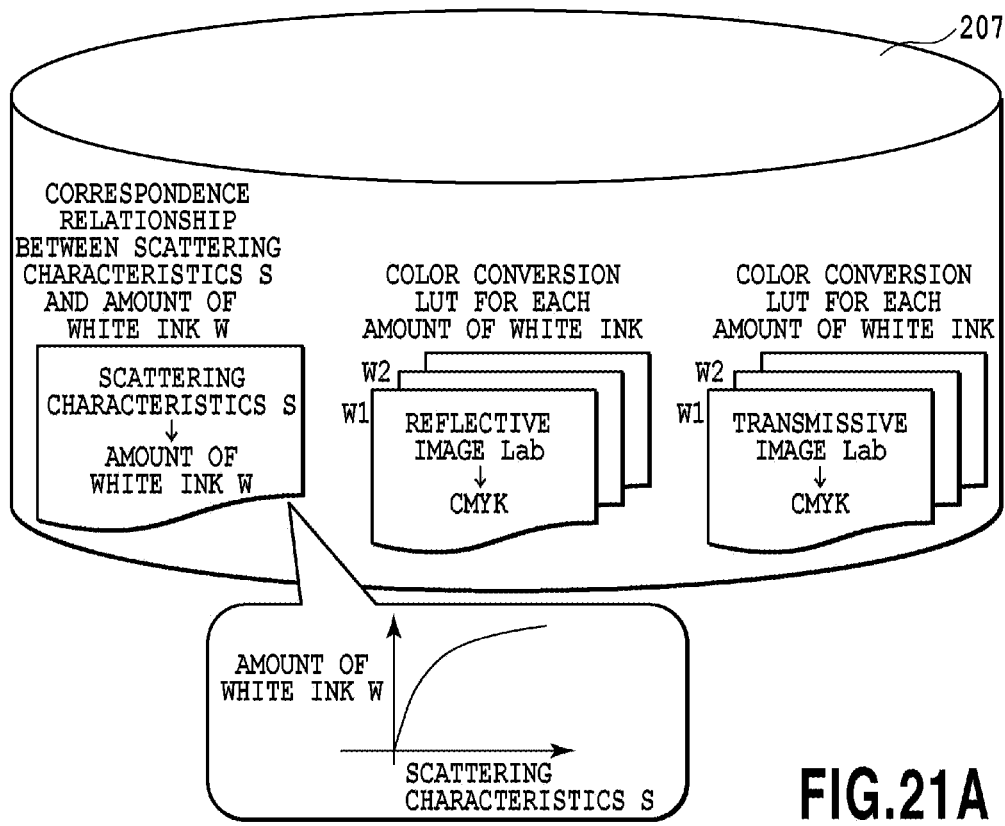

| REFLECTIVE IMAGE Lab→CMYK | | | | | | |
|---|---|---|---|---|---|---|
| REFLECTIVE IMAGE Lab | | | AMOUNTS OF COLOR INKS | | | |
| L | a | b | C | M | Y | K |
| XXX | XXX | XXX | XXX | XXX | XXX | XXX |
| XXX | XXX | XXX | XXX | XXX | XXX | XXX |
| XXX | XXX | XXX | XXX | XXX | XXX | XXX |
| . | . | . | . . . | | | |
| | | | XXX | XXX | XXX | XXX |
| XXX | XXX | XXX | XXX | XXX | XXX | XXX |
| XXX | XXX | XXX | XXX | XXX | XXX | XXX |
| . | . | . | . . . | | | |
| | | | XXX | XXX | XXX | XXX |
| . | . | . | | | | |
| . | . | . | | | | |
| XXX | XXX | XXX | XXX | XXX | XXX | XXX |
| XXX | XXX | XXX | XXX | XXX | XXX | XXX |
| . | . | . | XXX | XXX | XXX | XXX |
| . | . | . | XXX | XXX | XXX | XXX |
| . | . | . | XXX | XXX | XXX | XXX |
| | | | XXX | XXX | XXX | XXX |
| XXX | XXX | XXX | XXX | XXX | XXX | XXX |
| XXX | XXX | XXX | XXX | XXX | XXX | XXX |

IMAGE PROCESSING APPARATUS AND IMAGE PROCESSING METHOD

BACKGROUND OF THE INVENTION

Field of the Invention

The present invention relates to a technique of reproducing a translucent body.

Description of the Related Art

In the field of printing product packages, outdoor advertisements, and building materials, it is required to reproduce a translucent body. The appearance of the translucent body is determined by both transmissive light which is transmitted through the translucent body and reflective light which is reflected from the surface and inside of the translucent body. Accordingly, the reproduction of the translucent body requires color management considering both the transmissive light and the reflective light.

For example, there is a technique disclosed in Japanese Patent Laid-Open No. 2011-61723 as a technique of performing appropriate color management for a printed object observed under the influence of both a transmissive light source and a reflective light source. Japanese Patent Laid-Open No. 2011-61723 discloses the technique of obtaining spectral emission luminosity from a printed object in an observational environment in which the transmissive light source and the reflective light source coexist and calculating a colorimetric value in a desired observational environment based on the spectral emission luminosity.

In the case of performing color management by using the method disclosed in Japanese Patent Laid-Open No. 2011-61723, an observational environment for which color management is to be performed is designated, and based on the measurement values of a printed object in the observational environment, a printed object reproducing a desired color is formed. However, this printed object reproduces the desired color in the designated observational environment, and an appearance in another observational environment is not considered. Accordingly, there is a problem that whenever the observational environment changes, it is necessary to recalculate the measurement values to form the printed object again.

SUMMARY OF THE INVENTION

In an aspect of the present invention, there is provided an image processing apparatus comprising: a first obtaining unit configured to obtain first information including reflective characteristics of an object to be reproduced; a second obtaining unit configured to obtain second information including transmissive characteristics of the object to be reproduced; and a determining unit configured to determine an amount of coloring material for each pixel of an image representing the object to be reproduced based on the first information and the second information.

Further features of the present invention will become apparent from the following description of exemplary embodiments (with reference to the attached drawings).

BRIEF DESCRIPTION OF THE DRAWINGS

FIG. 4 is a view showing a user interface displayed in a UI displaying unit according to Embodiment 1;

FIG. 15 is a view showing an example of a color conversion LUT for calculating an ink amount from the CIELAB values of a reflective image and a transmissive image as explained in Embodiment 3;

FIG. 21A is a schematic diagram for explaining data in the data holding unit; and FIG. 21B is a schematic diagram for explaining a color conversion table.

DESCRIPTION OF THE EMBODIMENTS

The present invention will be described below in detail based on preferred embodiments with reference to the attached drawings. Incidentally, the features of the following embodiments are mere examples, and the present invention is not limited to the illustrated features.

Embodiment 1

In the present embodiment, explanation will be made on an example in which a reflective image is obtained by capturing an image of a translucent body to be reproduced with a reflective light source, and a transmissive image is obtained by capturing an image of the translucent body with a transmissive light source, and the translucent body is reproduced as a printed object based on the reflective image and the transmissive image.

Figure 1:
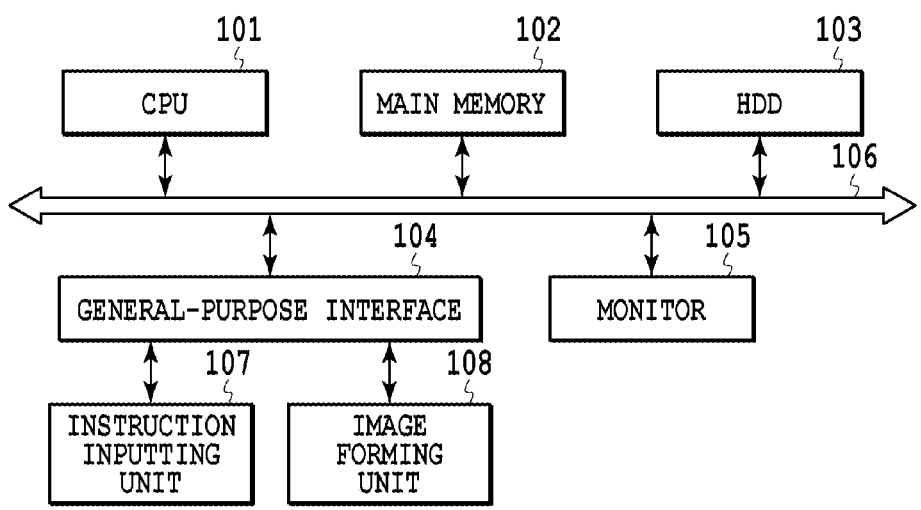
FIG. 1 is a diagram showing the physical configuration of an image processing apparatus according to Embodiment 1.

FIG. 1 is a block diagram of an image processing apparatus according to the present embodiment. An image processing apparatus includes a CPU 101, a main memory 102, an HDD 103, a general-purpose interface 104, a monitor 105, a main bus 106, an instruction inputting unit 107 such as a keyboard or a mouse, and an image forming unit 108. The general-purpose interface 104 connects the instruction inputting unit 107, the image forming unit 108, and the like to the main bus 106.

A description will be given below of various processing operations which are realized by the CPU 101 executing various types of software (computer programs) stored in the HDD 103. First, the CPU 101 starts an image processing application stored in the HDD 103 according to a user's instruction to the instruction inputting unit 107. Then, the image processing application is expanded in the main memory 102, and a user interface is displayed on the monitor 105. Then, various types of data stored in the HDD 103 are transferred to the main memory 102 via the main bus 106 according to a command from the CPU 101. The various types of data transferred to the main memory 102 are subjected to predetermined arithmetic processing according to the command from the CPU 101, and the result of the arithmetic processing is displayed on the monitor 105 or stored in the HDD 103 via the main bus 106.

Regarding the above configuration, explanation will be made on processing performed by the image processing application according to the command from the CPU 101.

Figure 2:
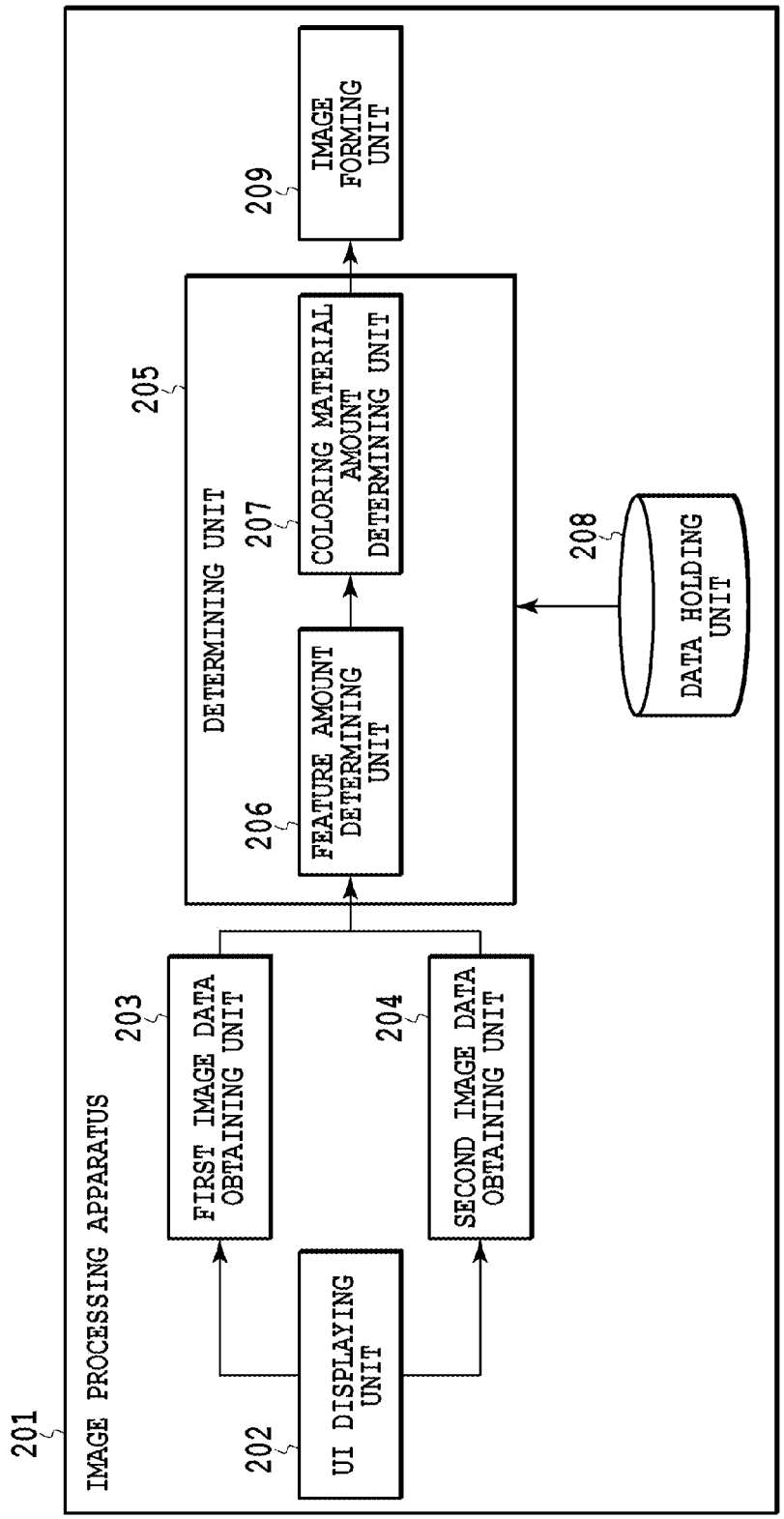
FIG. 2 is a block diagram showing the logical configuration of the image processing apparatus according to Embodiment 1.

FIG. 2 is a diagram showing the logical configuration of the image processing apparatus 201 according to the present embodiment. The image processing apparatus 201 includes a UI displaying unit 202, a first image data obtaining unit 203, a second image data obtaining unit 204, a determining unit 205, a data holding unit 208, and an image forming unit 209. Further, the determining unit 205 includes a feature amount determining unit 206 and a coloring material amount determining unit 207. Incidentally, FIG. 2 shows a configuration example in which the image processing apparatus includes the image forming unit 209, but the image processing apparatus may include the image forming unit outside of the image processing apparatus 201. More specifically, the image processing apparatus 201 may be an apparatus which generates coloring material amount data for determining the amount of a coloring material used for the image forming unit.

The UI displaying unit 202 displays a user interface or the like on the monitor 105. The first image data obtaining unit 203 obtains reflective image data designated by the user via the user interface displayed by the UI displaying unit 202. The second image data obtaining unit 204 obtains transmissive image data designated by the user via the user interface displayed by the UI displaying unit 202. The reflective image data and the transmissive image data are image data obtained by performing image-capturing on the same object (the same object to be reproduced) under different image-capturing conditions. Hereinafter, an image represented by the reflective image data is simply referred to as a reflective image, and an image represented by the transmissive image data is referred to as a transmissive image. The determining unit 205 determines the amount of the coloring material for reproducing the object to be reproduced based on the obtained reflective image data and transmissive image data. The determining unit 205 includes the feature amount determining unit 206 and the coloring material amount determining unit 207, which perform the following processing to determine the amount of the coloring material. More specifically, the feature amount determining unit 206 determines a feature amount for reproducing characteristics appearing in the reflective image and the transmissive image based on the reflective image data and the transmissive image data. The coloring material amount determining unit 207 determines the amount of the coloring material based on the determined feature amount.

The data holding unit 208 holds a table and the like associating the characteristics of the coloring material, the feature amount, and the like. The image forming unit 209 forms an image based on the determined amount of the coloring material.

<Operation of the Image Processing Apparatus 201>

Figure 3:
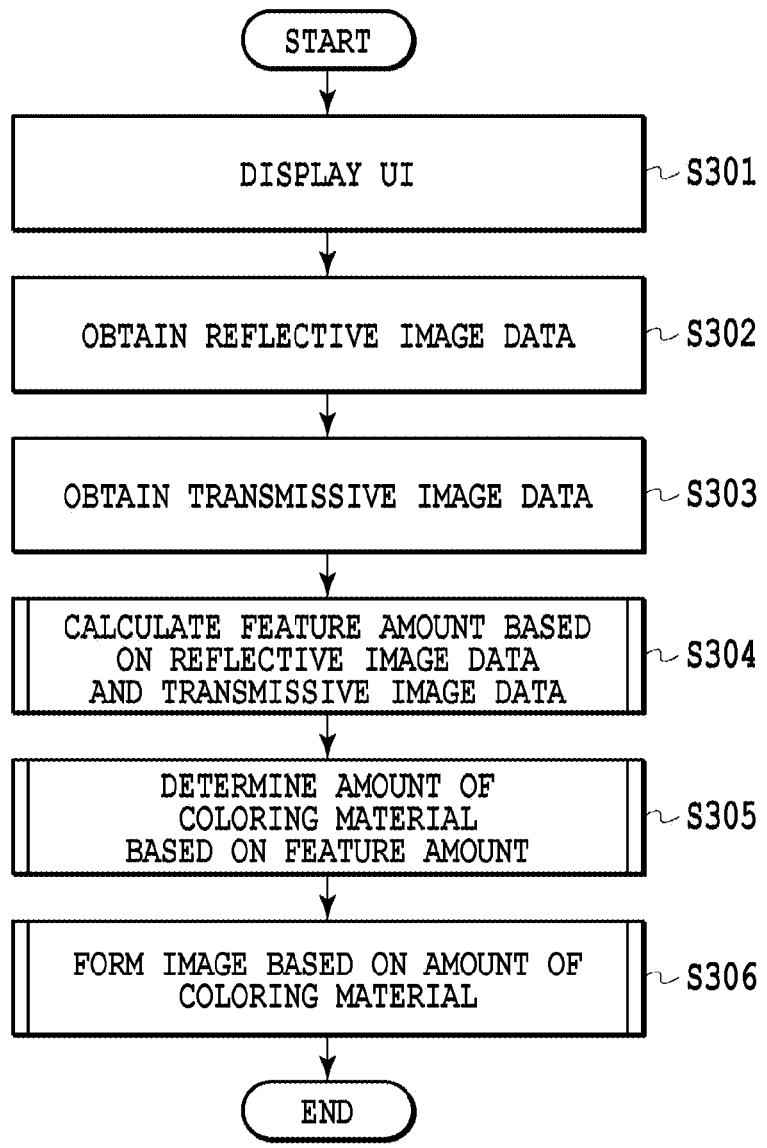
FIG. 3 is a flowchart of processing performed by the image processing apparatus according to Embodiment 1.

FIG. 3 is a flowchart of processing performed by the image processing apparatus 201. Processing shown in FIG. 3 is realized by the image processing application functioning as each unit shown in FIG. 2 according to the command from the CPU 101.

In step S301, the UI displaying unit 202 displays, on the monitor 105, the user interface for enabling the user to input information necessary for performing image processing. FIG. 4 shows an example of the user interface.

In a designation input item 401, the user designates the reflective image data representing the reflective image obtained by capturing an image of the translucent body to be reproduced with the reflective light source to input the reflective image data to the image processing apparatus 201. In a designation input item 402, the user designates the transmissive image data representing the transmissive image obtained by capturing an image of the translucent body to be reproduced with the transmissive light source to input the transmissive image data to the image processing apparatus 201. An input image displaying unit 403 displays the reflective image data and the transmissive image data designated by the user in the designation input item 401 and the designation input item 402. An output image displaying unit 404 displays a preview of a printed object reproducing the translucent body based on the input image data. A process button 405 is a button for giving an instruction to perform processing for calculating the amount of the coloring material in the printed object. An output button 406 is a button for performing processing for forming the printed object based on the calculated amount of the coloring material. In a case where the user performs input to each designation input unit, and gives an instruction to press the process button 405, the process proceeds to step S302.

Figure 5A:
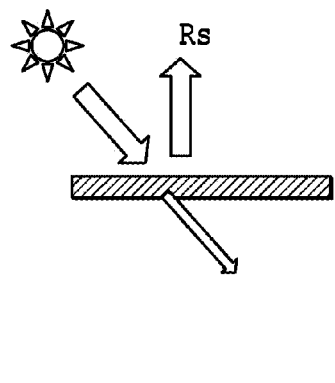
FIGS. 5A to 5D are views showing examples of a method for obtaining image data including reflection and transmission as explained in embodiments.

In step S302, the first image data obtaining unit 203 obtains reflective image data on the object to be reproduced as designated by the user via the user interface displayed in step S301. The reflective image data can be obtained by emitting light from an angle of 45 degrees with respect to a front side of the object to be reproduced, and capturing, with an image input device such as a digital camera, reflective light Rs travelling in a zero-degree direction with respect to a normal to the front side of the object to be reproduced as shown in FIG. 5A, for example. The reflective light Rs includes surface reflective light reflected from the surface of the object to be reproduced and inner reflective light reflected from the inside of the object to be reproduced. At the time of image-capturing, it is necessary to be careful not to capture, together with the reflective light Rs, light transmitted through the object to be reproduced and reflected from another object. Incidentally, the geometrical condition explained in the present embodiment is an example, and it is needless to say that the reflective image data may be obtained under another geometrical condition.

Figure 5B:
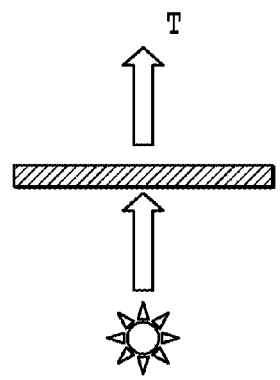

In step S303, the second image data obtaining unit 204 obtains the transmissive image data on the object to be reproduced designated by the user via the user interface displayed in step S301. The transmissive image data can be obtained by emitting light from an angle of zero degrees with respect to a normal of a back side of the object to be reproduced and capturing, with the image input device such as the digital camera, transmissive light T travelling in a zero-degree direction with respect to a normal of the front side as shown in FIG. 5B, for example. It is preferable that a positional relationship between the object to be reproduced and the digital camera be the same as the one at the time capturing the reflective image. Incidentally, the geometrical condition explained in the present embodiment is an example, and it is needless to say that the transmissive image data may be obtained under another geometrical condition.

Figure 6:
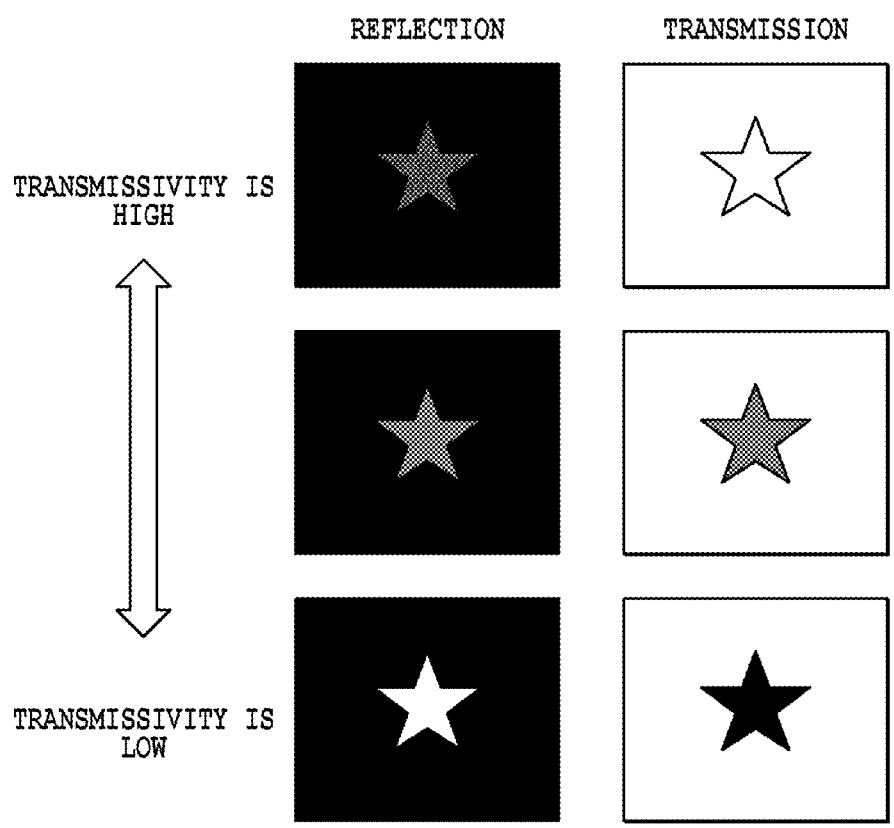
FIG. 6 is a view showing a relationship between a reflective image and a transmissive image as explained in the embodiments.

In step S304, the feature amount determining unit 206 calculates a feature amount corresponding to both the reflective light and the transmissive light from the object to be reproduced based on the reflective image data obtained in step S302 and the transmissive image data obtained in step S303. FIG. 6 shows a relationship between the reflective image obtained in step S302 and the transmissive image obtained in step S303. In FIG. 6, a star-shaped region is the object to be reproduced. In a case where the object to be reproduced has high transmissivity, most of light from the light source is transmitted through the object to be reproduced, and the reflective image obtained by above-described image-capturing method is a dark-color image. Further, the transmissive image is a light-color image. On the other hand, in a case where the object to be reproduced has low transmissivity, light from the light source is reflected or absorbed, and the transmissive image obtained by above-described image-capturing method is a dark-color image. Further, the reflective image can be a light-color image or a dark-color image depending on the reflective and absorption characteristics of the object. In view of the above, the feature amount determining unit 206 calculates the feature amount of the object to be reproduced by using the characteristics that the lightness of the reflective image and the transmissive image varies depending on the transmissivity of the object to be reproduced. Specific processing by the feature amount determining unit 206 will be described later.

In step S305, the coloring material amount determining unit 207 determines the amount of the coloring material in the printed object based on the feature amount determined in step S304. Specific processing by the coloring material amount determining unit 207 will be described later.

In step S306, the image forming unit 209 forms an image on a transparent print medium (for example, a film) based on the amount of the coloring material determined in step S305, and ends the process. Specific processing by the image forming unit 209 will be described later. Incidentally, as described above, step S306 may be performed by an apparatus other than the image processing apparatus 201.

<Operation of the Feature Amount Determining Unit 206 in Step S304>

Figure 7:
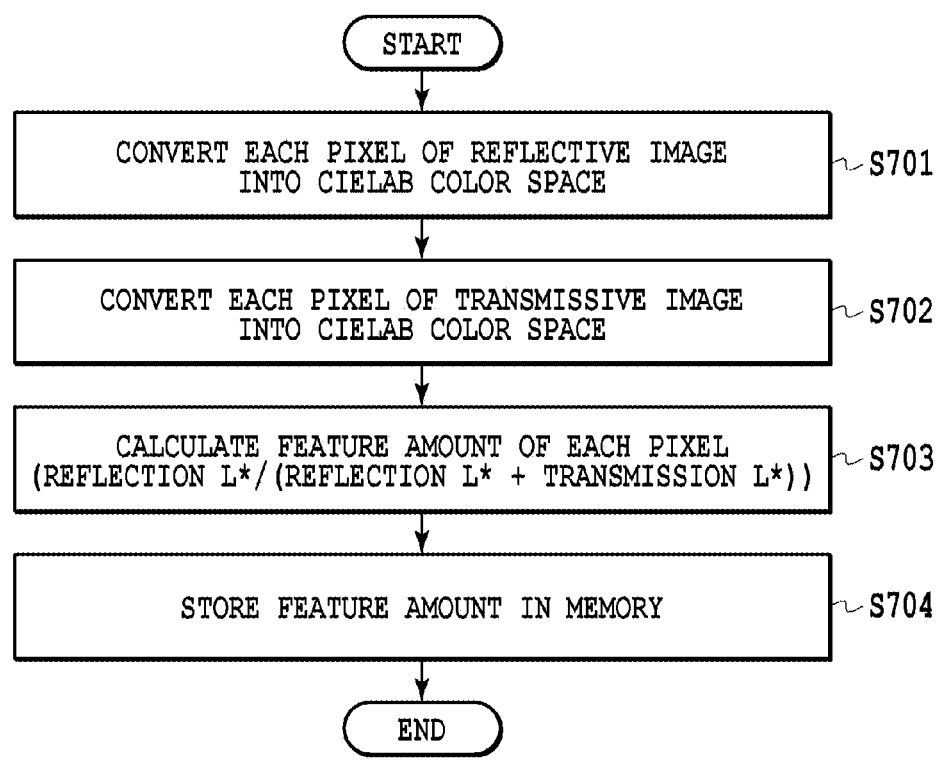
FIG. 7 is a flowchart showing the operation of a feature amount determining unit according to Embodiment 1.

FIG. 7 is a flowchart of the processing performed by the feature amount determining unit 206 in step 304.

In step S701, the feature amount determining unit 206 converts each pixel in the reflective image into CIELAB values. Subsequent processing will be described below by assuming that the reflective image and the transmissive image in the present embodiment are recorded in sRGB color space prescribed by the CIE (the International Commission on Illumination). Further, the reflective image and the transmissive image have the same resolution, and the pixel positions of the object to be reproduced in the reflective image correspond to those in the transmissive image.

Naturally, in a case where the pixel positions of the object to be reproduced in the reflective image are not aligned to those in the transmissive image to some extent, the positions of the pixels may be adjusted by performing publicly-known rotational processing or the like. First, each pixel in the reflective image is converted into CIE tristimulus values X, Y, and Z by using the following formulas (1) and (2).

$$R_{Linear} = \begin{cases} R/12.92 & R \le 0.04045 \\ [(R+0.055)/1.055]^{2.4} & R > 0.04045 \end{cases} \quad \text{Formula (1)}$$

$$G_{Linear} = \begin{cases} G/12.92 & G \le 0.04045 \\ [(G+0.055)/1.055]^{2.4} & G > 0.04045 \end{cases}$$

$$B_{Linear} = \begin{cases} B/12.92 & B \le 0.04045 \\ [(B+0.055)/1.055]^{2.4} & B > 0.04045 \end{cases}$$

$$\begin{pmatrix} X \\ Y \\ Z \end{pmatrix} = \begin{pmatrix} 0.4124 & 0.3576 & 0.1805 \\ 0.2126 & 0.7152 & 0.0722 \\ 0.0193 & 0.1192 & 0.9505 \end{pmatrix} \begin{pmatrix} R_{Linear} \\ G_{Linear} \\ B_{Linear} \end{pmatrix} \quad \text{Formula (2)}$$

Then, the CIE tristimulus values X, Y, and Z are converted into CIELAB values by using the following formula (3).

$$f_x = \begin{cases} (X/X_w)^{1/3} & X > 0.008856 \\ 903.3 \times (X/X_w)/116 & X \le 0.008856 \end{cases} \quad \text{Formula (3)}$$

$$f_y = \begin{cases} (Y/Y_w)^{1/3} & Y > 0.008856 \\ 903.3 \times (Y/Y_w)/116 & Y \le 0.008856 \end{cases}$$

$$f_z = \begin{cases} (Z/Z_w)^{1/3} & Z > 0.008856 \\ 903.3 \times (Z/Z_w)/116 & Z \le 0.008856 \end{cases}$$

$$L = 116 \times f_y - 16$$

$$a = 500 \times (f_x - f_y)$$

$$b = 500 \times (f_y - f_z)$$

where X, Y, and Z are tristimulus values in a XYZ color space,

Xw, Yw, and Zw are the tristimulus values of a white point, and in D65, Xw=95.05, Yw=100.0, and Zw=108.91.

This processing is performed on all the pixels of the reflective image. As a result, each pixel in the reflective image is converted into the CIELAB values.

In step S702, the feature amount determining unit 206 converts each pixel in the transmissive image into the CIELAB values. A converting method is the same as the one in step S701, and explanation thereof will be omitted.

In step S703, the feature amount determining unit 206 calculates the feature amount of each pixel in the object to be reproduced. The feature amount in the present embodiment does not represent only either one of the transmissive characteristics and the reflective characteristics, but represents a ratio between the reflective light and the transmissive light. Here, the feature amount S in the present embodiment is defined as a ratio between the lightness of the transmissive image and the lightness of the reflective image, and more specifically, the feature amount S is calculated by using the following formula (4).

$$S = L_R/(L_R + L_T) \quad \text{Formula (4)}$$

where $L_R$ is an L value in CIELAB color space for the reflective image, and $L_T$ is an L value in CIELAB color space for the transmissive image.

In step S704, the feature amount determining unit 206 stores, in the main memory 102, the feature amount of each pixel in the object to be reproduced calculated in step S703 together with the CIELAB values of the pixel, and ends the process.

<Operation of the Coloring Material Amount Determining Unit 207 in Step 305>

Figure 8:
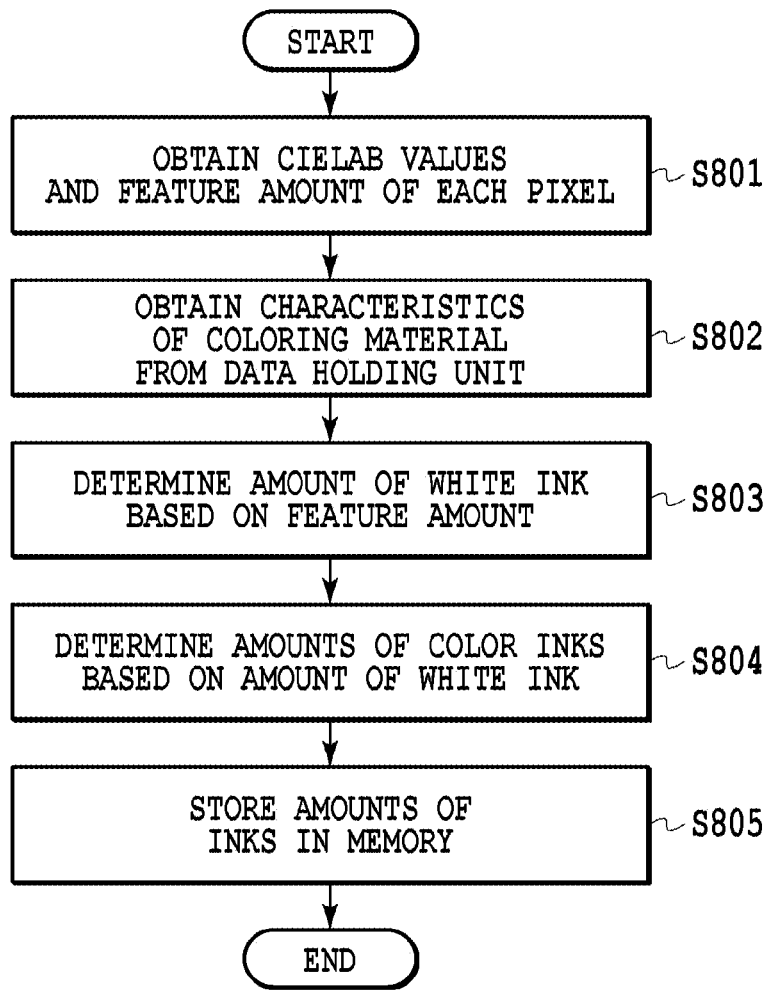
FIG. 8 is a flowchart showing the operation of a coloring material amount determining unit according to Embodiment 1.

FIG. 8 is a flowchart of the processing performed by the coloring material amount determining unit 207 in step S305.

In step S801, the coloring material amount determining unit 207 obtains the CIELAB values of each pixel in an image and the feature amount of each pixel in the image as calculated in step S304. The obtained CIELAB values may be those of the reflective image or those of the transmissive image, but in the present embodiment, the CIELAB values of the reflective image are obtained.

Figures 9A, 9B:
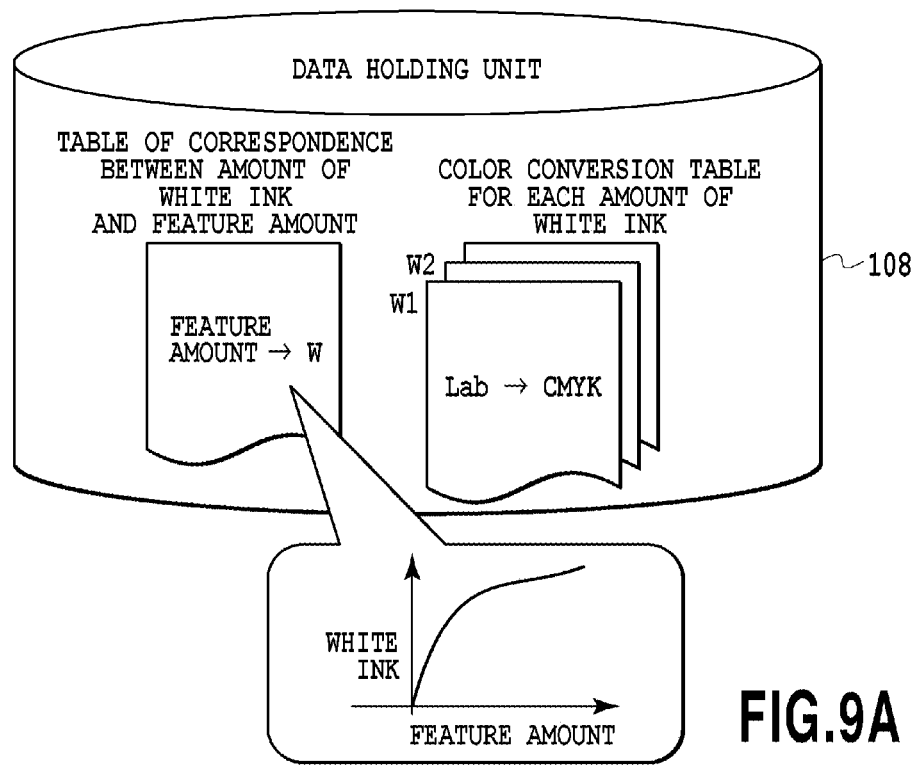
FIGS. 9A and 9B are views showing the inner structure of a data holding unit and a color conversion table according to Embodiment 1.

In step S802, the coloring material amount determining unit 207 obtains the characteristics of the coloring material from the data holding unit 208. FIGS. 9A and 9B show an example of the characteristics of the coloring material stored in the data holding unit 208. As shown in FIG. 9A, the data holding unit 208 holds a correspondence table in which the amount of a white ink is associated with the feature amount and a color conversion table for each amount of the white ink. The white ink is an ink used for the image forming unit 209 to form the printed object, and functions as a scatterer, thereby controlling the ratio between the reflective light and the transmissive light from the printed object. As stated above, in the present embodiment, the image of the object to be reproduced is formed on the transparent print medium (for example, the film). On this occasion, as the amount of the white ink is increased, the reflective light increases, and the reflectivity of the printed object increases. Further, as more light is reflected from or absorbed by the white ink, the transmissive light decreases, and the transmissivity of the printed object decreases. Conversely, as the amount of the white ink is decreased, the reflectivity of the printed object decreases, and the transmissivity increases. The data holding unit 208 holds a correspondence table showing the amount of the white ink corresponding to the characteristics (that is, the feature amount) of such a translucent body. Incidentally, the correspondence table held by the data holding unit 208 is created by previously changing the amount of the white ink, forming the printed object by the image forming unit 209, and making measurements.

Further, the image forming unit 209 equips color inks for controlling color as well as the white ink for controlling the ratio between the reflective light and the transmissive light emitted from the object to be reproduced. In the present embodiment, the color inks are four color inks, that is, C (cyan), M (magenta), Y (yellow), and K (black) inks. Further, for simple explanation, the scattering characteristics of these inks are sufficiently smaller than those of the white ink, and the ratio between the reflective light and the transmissive light is not affected. There is created in advance, for each amount of the white ink, a color conversion table specifying a relationship between a combination of the amounts of the color inks corresponding to the characteristics of the image forming unit 209 and the CIELAB values, and the data storing unit 208 stores the color conversion table therein. The reason why the color conversion table is prepared for each amount of the white ink is that the combination of the color inks representing the predetermined CIELAB values varies according to the amount of the white ink. The color conversion table held by the data holding unit 208 is a table showing a relationship between each lattice point and the amounts of the C, M, Y, and K inks reproducing the lattice point. This lattice point is a lattice point produced by dividing the ranges of the CIELAB values (for example, $0 \leq L^* 100$, $-128 \leq a^*, b^* \leq 127$) into 17 slices for each axis. This table is created in advance for each amount of the white ink. On this occasion, in a case where the CIELAB values of the lattice point are outside the color gamut which can be reproduced by the image forming unit 209, processing to set the CIELAB values of the lattice point within the color gamut is appropriately performed by performing color gamut compression (gamut mapping). Either of the reflective image and the transmissive image may presumed to set the CIELAB values, but these CIELAB values need to correspond to the CIELAB values obtained in step S801. In the present embodiment, explanation will be made on an example of holding a color conversion table specifying a relationship between the CIELAB values of the reflective image and the amounts of the color inks as shown in FIG. 9B. Incidentally, any method may be used as a method for creating the color conversion table. Since there are many known methods, their explanation will be omitted in the present embodiment. In step S802, as the characteristics of the coloring material, there are obtained two types of tables, that is, the correspondence table in which the amount of the white ink is associated with the feature amount and the color conversion table.

In step S803, the coloring material amount determining unit 207 determines the amount of the white ink realizing the feature amount of each pixel by referring to the correspondence table obtained in step S802.

In step S804, the coloring material amount determining unit 207 calculates the amounts of the color inks for reproducing the reflective CIELAB values of each pixel by referring to the color conversion table corresponding to the amount of the white ink for each pixel as determined in step S803. The amounts of the color inks may be calculated by performing interpolation calculation based on the color conversion table. It is possible to use, as an interpolation method, an already-known method such as tetrahedral interpolation or cubic interpolation.

In step S805, the calculated amount of the white ink and the calculated amounts of the color inks for each pixel are stored in a memory, and the process ends.

Incidentally, in the present embodiment, the correspondence table is used to calculate the amount of the white ink from the feature amount. However, the amount of the white ink can be calculated by using an approximation formula to obtain a relationship between the amount of the white ink and the feature amount. For example, the following formula (5) can be used as a formula for calculating the amount of the white ink W from the feature amount S.

$$W = kS^n \quad \text{Formula (5)}$$

where k and n are constants, and appropriate values may be stored as k and n beforehand.

<Operation of the Image Forming Unit 209 in Step S306>

Figure 10:
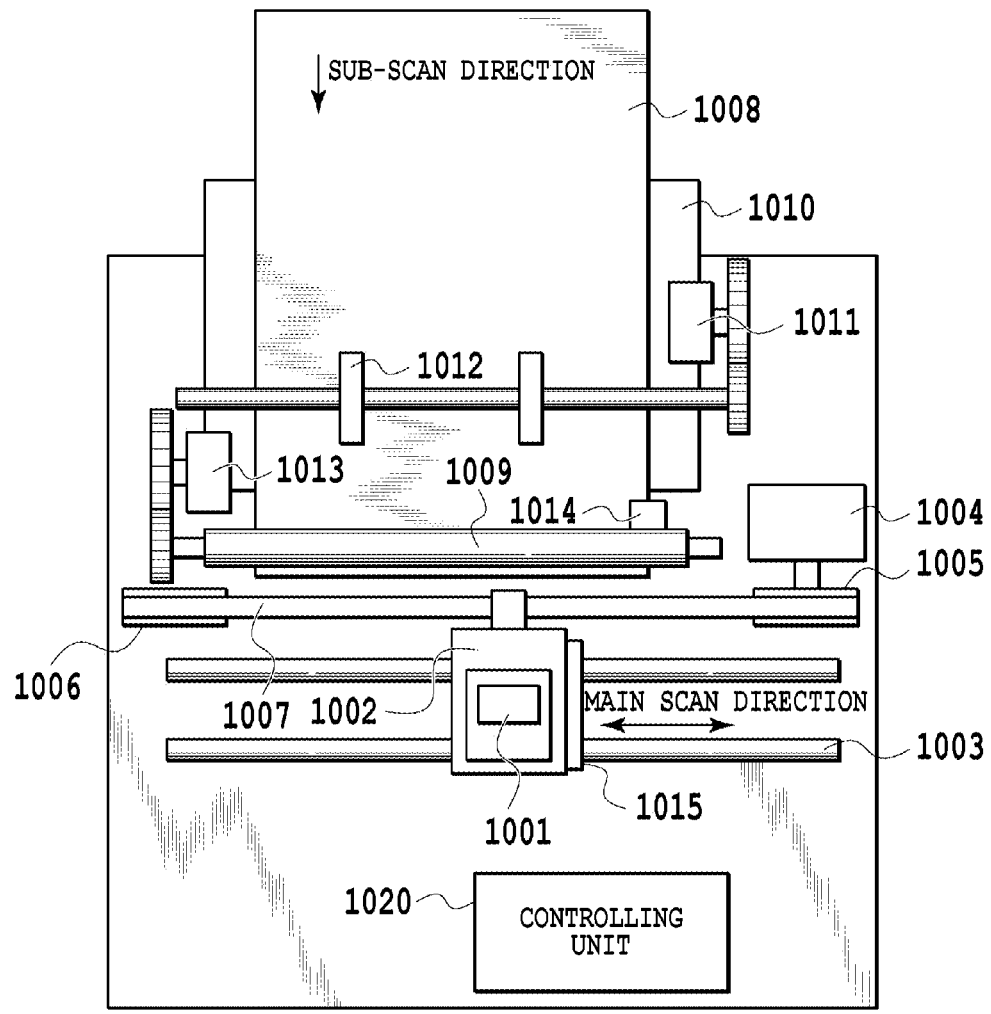
FIG. 10 is a view showing the structure of an image forming unit according to Embodiment 1.

FIG. 10 is a view showing the structure of the image forming unit 209. A head cartridge 1001 includes a print head having a plurality of ejection openings and an ink tank for supplying an ink to the print head, and is provided with a connector for receiving a signal or the like for driving each ejection opening of the print head. The ink tank is independently provided with a total of five types of color inks, that is, the white ink and the C (cyan), M (magenta), Y (yellow), and K (black) inks for controlling the feature amount. The head cartridge 1001 is positioned and exchangeably mounted in a carriage 1002, and the carriage 1002 is provided with a connector holder for transmitting a drive signal or the like to the head cartridge 1001 via the connector. The carriage 1002 can reciprocate along a guide shaft 1003. More specifically, the carriage 1002 is driven by a main scan motor 1004 as a driving source via a driving mechanism such as a motor pulley 1005, a driven pulley 1006, and a timing belt 1007, and the position and movement of the carriage 1002 are controlled. Incidentally, the movement of the carriage 1002 along the guide shaft 1003 is referred to as a "main scan," and the moving direction is referred to as a "main scan direction." A print medium 1008 such as a transmissive film for printing is placed on an automatic sheet feeder (hereinafter referred to as the "ASF") 1010. At the time of forming an image, a paper feed motor 1011 is driven to rotate a pickup roller 1012 via a gear, and the print medium 1008 is separated and fed from the ASF 1010 one by one. Further, the print medium 1008 is conveyed to a print start position facing an ejection-opening surface of the head cartridge 1001 on the carriage 1002 by rotation of a conveying roller 1009. The conveying roller 1009 is driven by a line field (LF) motor 1013 as a driving source via a gear. Whether the print medium 1008 is fed or not and a position at the time of feeding are determined at the time of the passage of the print medium 1008 through a paper end sensor 1014. The head cartridge 1001 mounted on the carriage 1002 is held so that the ejection-opening surface protrudes downward from the carriage 1002 and is parallel to the print medium 1008. A controlling unit 1020 controls the operation of each part of the image forming unit 209 based on the amount of the white ink and the amounts of the color inks for each pixel as calculated in step S305. For ease of explanation, a description will be given by assuming that in the present embodiment, the image forming unit 209 is a binary printer which controls whether or not to eject an ink at a predetermined resolution. Naturally, it is possible to use a system capable of adjusting the size of an ink droplet to be ejected.

Explanation will be made on the operation of forming an image. First, in a case where the print medium 1008 is conveyed to the predetermined print start position, the carriage 1002 moves along the guide shaft 1003 above the print medium 1008, and during the movement of the carriage 1002, the ink is ejected from the ejection openings of the print head. In a case where the carriage 1002 is moved to one end of the guide shaft 1003, the conveying roller 1009 conveys the print medium 1008 by a predetermined distance in a direction perpendicular to the scan direction of the carriage 1002. This conveying of the print medium 1008 is referred to as the "paper feed" or the "sub-scan," and this conveying direction is referred to as the "paper feed direction" or the "sub-scan direction." In a case where the print medium 1008 has been conveyed by the predetermined distance, the carriage 1002 moves again along the guide shaft 1003. In this manner, an image is formed on the entire print medium 1008 by repeating the scan and the feed by the carriage 1002 for the print head.

Incidentally, the print medium used in the present embodiment may be a transparent body or a translucent body, preferably has high transmissivity, and may be used to form an image by the print head. It is possible to use various materials such as polyvinyl chloride, acryl, and PET. Further, it is conceivable to use a mode in which a plurality of color conversion tables to be used for step S305 are held, and a suitable color conversion table is used according to the print medium, or the like. Further, in the present embodiment, an example of an inkjet system as the image forming unit is presented, but another printing system may be used.

Figure 11:
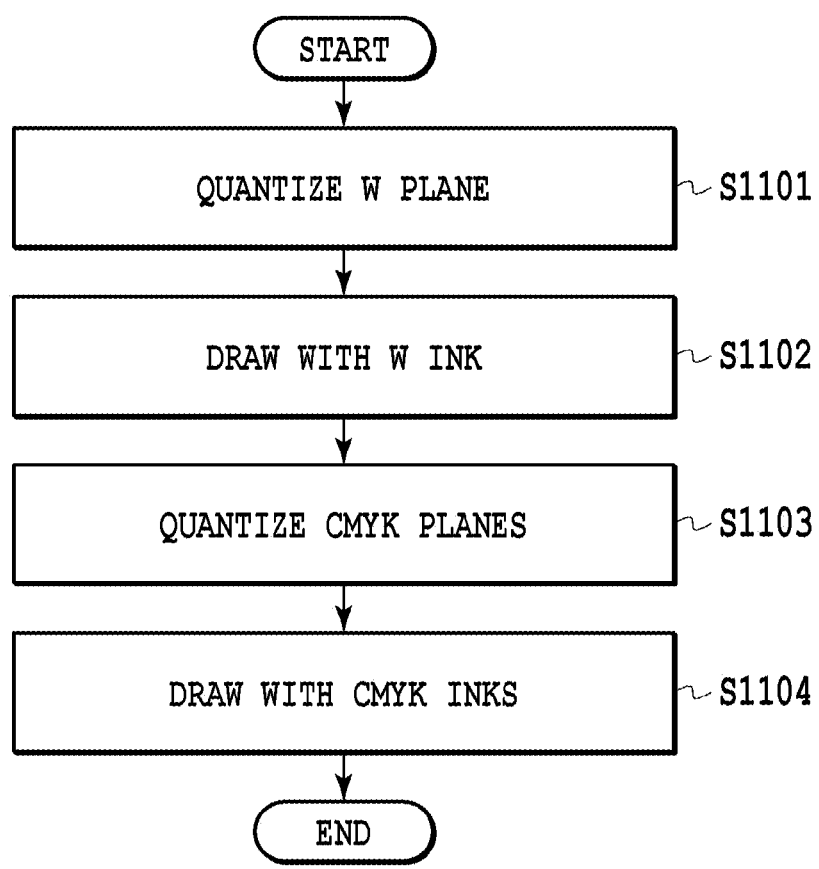
FIG. 11 is a flowchart showing the operation of the image forming unit according to Embodiment 1.

FIG. 11 is a flowchart of the processing performed by the image forming unit 209 in step S306.

In step S1101, the image forming unit 209 quantizes the multivalued amount of the white ink for each pixel as calculated in step S305 into binary data based on which the image forming unit 209 can form an image. A quantizing method may be a general method such as a dither matrix method or an error diffusion method. The cycle (distribution) of the white ink can be adjusted by performing such an area gradation method to perform quantization. Incidentally, explanation has been made based on the premise that the resolution of the input image is equal to that of the image forming unit, but in a case where the resolution of the input image is different from that of the image forming unit, resolution conversion processing may be performed.

In step S1102, the image forming unit 209 uses and ejects the white ink to form the image based on the binary data obtained by the quantization in step S1101. In step S1103, the image forming unit 209 quantizes the multivalued amounts of the color inks for each pixel as calculated in step S305 into binary data for each ink color. In step S1104, the image forming unit 209 uses and ejects the color inks to form the image based on the binary data obtained by the quantization in step S1103. The above processing in steps S1101 to S1104 is repeatedly performed for each paper feed operation until the entire image has been formed.

As explained above, in the present embodiment, the feature amounts represented in the reflective image and the transmissive image of the translucent body are determined based on the reflective image and the transmissive image of the translucent body. Further, explanation has been made on the example in which the image is formed by using the amount of the white ink and the amounts of the color inks which are calculated based on the feature amounts. More specifically, explanation has been made on the example in which the ratio between the reflective light and the transmissive light emitted from the object to be reproduced is controlled. This makes it possible to form the printed object having the feature amount equivalent to that of the translucent body, and accordingly, it is possible to obtain the printed object which reproduces the appearance of the translucent body in any observational environment.

Embodiment 2

In Embodiment 1, explanation has been made on the example in which the reflective image is input as information indicative of the reflective characteristics of the object to be reproduced, and the transmissive image is input as information indicative of the transmissive characteristics. In the present embodiment, explanation will be made on an example in which a black backing image and a white backing image are input as information indicative of the reflective characteristics and information indicative of the transmissive characteristics, respectively. Incidentally, the configuration of Embodiment 2 may be identical to that of Embodiment 1. Differences from Embodiment 1 lie in the details of the processing by the first image data obtaining unit 203, the second image data obtaining unit 204, and the feature amount determining unit 206. Accordingly, this processing will be described below, and explanation on the other processing operations will be omitted.

Figure 12:
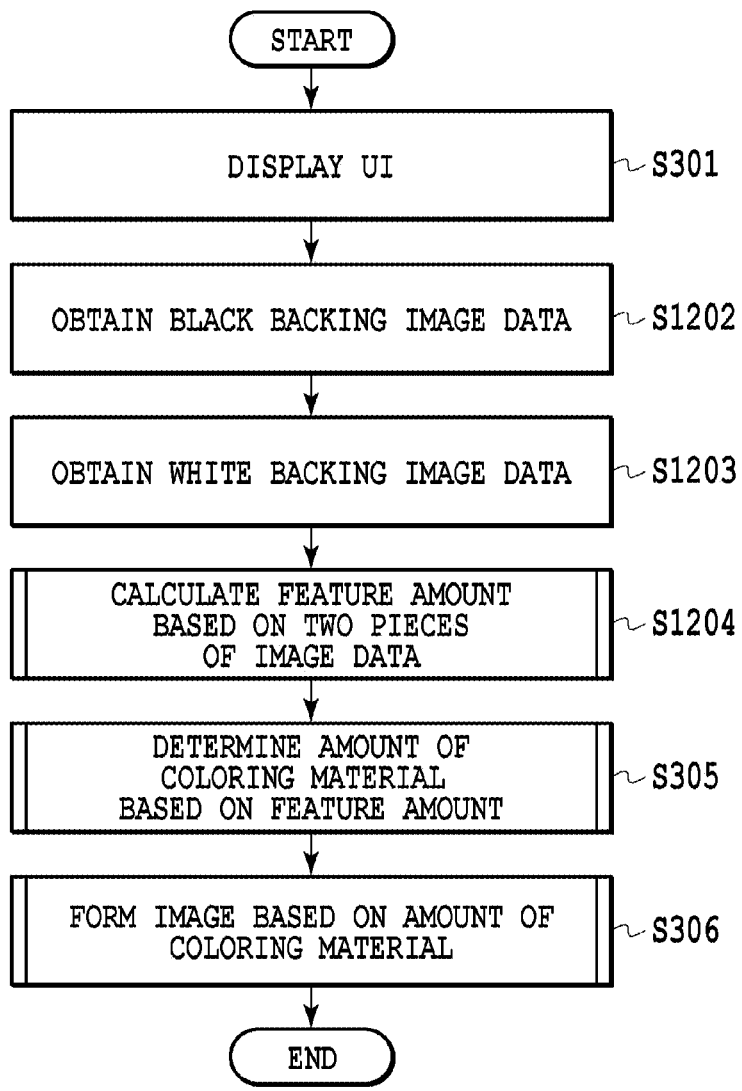
FIG. 12 is a flowchart of processing performed by the image processing apparatus according to Embodiment 2.

FIG. 12 is a flowchart of processing performed by the image processing apparatus 201 according to Embodiment 2. The flowchart of FIG. 12 is obtained by changing steps S302, S303, and S304 in the flowchart of FIG. 3 to steps S1202, S1203, and S1204, respectively. Explanation will be made on steps S1202, S1203, and S1204, which constitute the differences from Example 1.

Figure 5C:
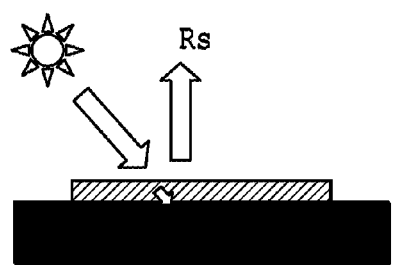

In step S1202, the first image data obtaining unit 203 obtains black backing image data produced by capturing an image of the object to be reproduced on a black backing. As shown in FIG. 5C, for example, a black member having negligibly small reflectivity is placed under the object to be reproduced, and as in Embodiment 1, light is emitted from a 45-degree direction with respect to the normal to the front side. Then, the image-capturing device such as the digital camera is provided in a zero-degree direction with respect to the normal to the front side to capture an image. In this case, since light transmitted through the object to be reproduced is absorbed by the black backing, the black backing image can be handled as the reflective image in which only the reflective light Rs is captured as in Embodiment 1. In step S1202, this black backing image is obtained.

Figure 5D:
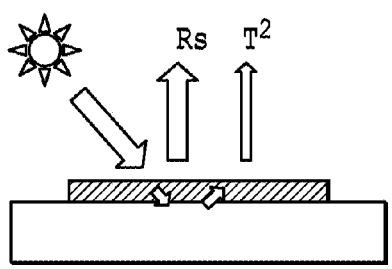

In step S1203, the second image data obtaining unit 204 obtains white backing image data produced by capturing an image of the object to be reproduced on a white backing. As shown in FIG. 5D, for example, a white member having reflectivity of about 100% is placed under the object to be reproduced, and light is emitted from a 45-degree direction with respect to the normal to the front side. Then, the image-capturing device such as the digital camera is provided in a zero-degree direction with respect to the normal to the front side to capture an image. In this case, the captured light includes not only the reflective light Rs, but also light $T^2$ transmitted through the object to be reproduced twice. This is because the transmissive light T transmitted through the object to be reproduced is reflected from the white backing, is transmitted through the object to be reproduced again, and is emitted from the object to be reproduced. In step S1203, the second image data obtaining unit 204 obtains the white backing image produced by capturing the light $Rs+T^2$.

In step S1204, the feature amount determining unit 206 calculates the feature amount based on the black backing image and the white backing image obtained in steps S1202 and S1203. Explanation will be made below on the specific processing by the feature amount determining unit 206.

Figure 13:
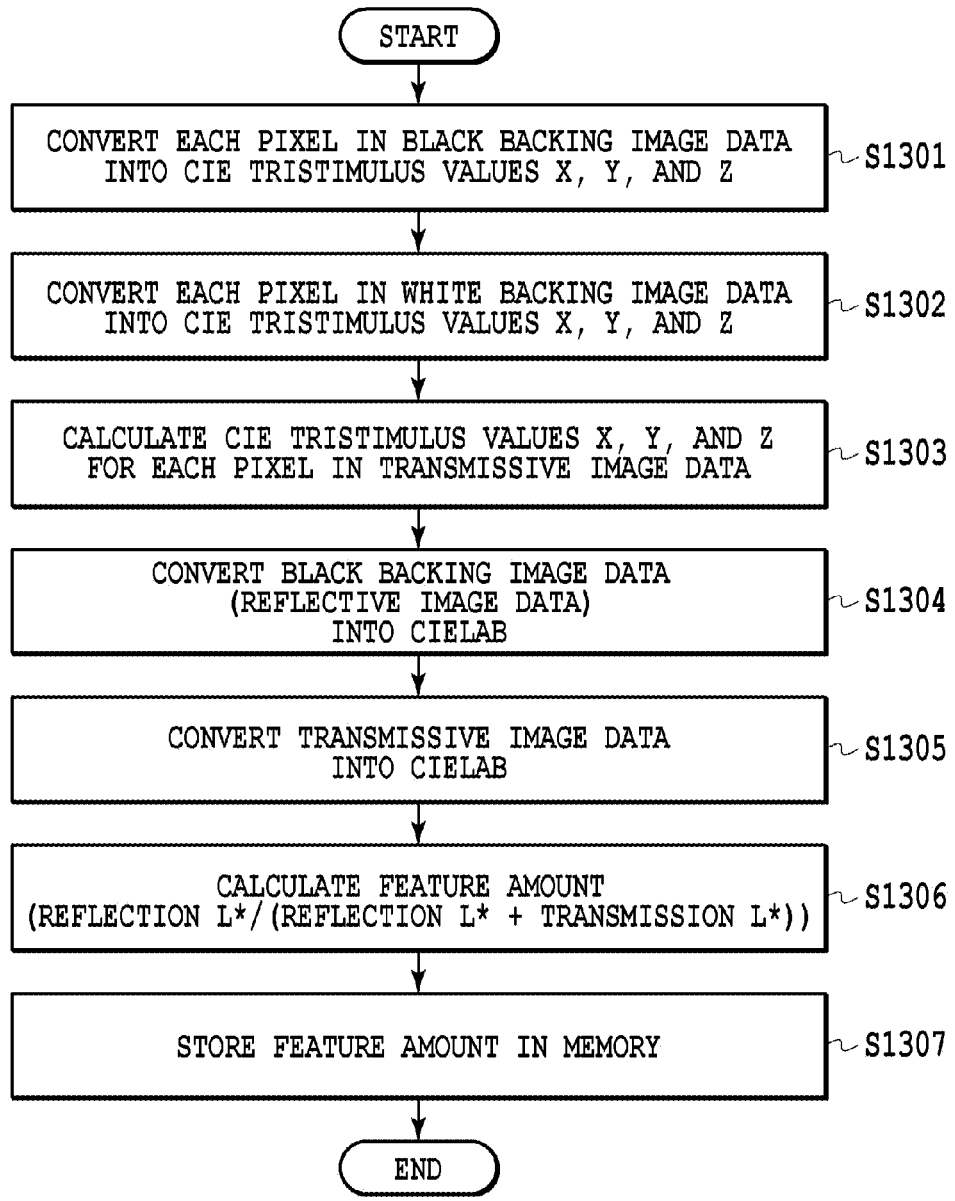
FIG. 13 is a flowchart showing the operation of the feature amount determining unit according to Embodiment 2.

FIG. 13 shows a flowchart of the processing by the feature amount determining unit 206 according to the present embodiment.

In step S1301, the feature amount determining unit 206 converts each pixel in the black backing image obtained in step S1202 into CIE tristimulus values X, Y, and Z. In the conversion, the above-described formulas (1) and (2) are used.

In step S1302, the feature amount determining unit 206 converts each pixel in the white backing image obtained in step S1203 into CIE tristimulus values X, Y, and Z. In the conversion, the above-described formulas (1) and (2) are used.

In step S1303, the feature amount determining unit 206 calculates CIE tristimulus values X, Y, and Z for each pixel in an image corresponding to the transmissive image. As described above, the black backing image is an image obtained by capturing the reflective light Rs, and the white backing image is an image obtained by capturing the light $Rs+T^2$, which is a mixture of the reflective light Rs and the transmissive light T. Accordingly, in a case where Ik is the CIE tristimulus values X, Y, and Z for the black backing image, Iw is the CIE tristimulus values X, Y, and Z for the white backing image, and It is the CIE tristimulus values X, Y, and Z for the image corresponding to the transmissive image, It can be calculated according to the following formula (6).

$$It=\sqrt{Iw-Ik} \qquad \text{Formula (6)}$$

In this manner, in step S1303, the value of each pixel in the black backing image and the value of each pixel in the white backing image are used to calculate the CIE tristimulus values X, Y, and Z for each pixel in the image corresponding to the transmissive image.

In step S1304, the feature amount determining unit 206 converts the CIE tristimulus values X, Y, and Z for each pixel in the black backing image (that is, the reflective image) into CIELAB values. In the conversion, the above-described formula (3) is used.

In step S1305, the feature amount determining unit 206 converts the CIE tristimulus values X, Y, and Z for each pixel in the image corresponding to the transmissive image as calculated in step S1303 into CIELAB values. In the conversion, the above-described formula (3) is used.

In step S1306, the feature amount determining unit 206 calculates the feature amount of each pixel. In the calculation, the above-described formula (4) is used. Incidentally, the calculation is performed by regarding the CIELAB values for the black backing image as the CIELAB values of the reflective image. In step S1307, the feature amount determining unit 206 stores, in a memory, the feature amount of each pixel calculated in step S1306 together with the CIELAB values of the pixel, and ends the process.

In the above description, explanation has been made on the example in which in the present embodiment, the feature amount indicative of the ratio between the reflective light and the transmissive light emitted from the object to be reproduced is determined based on the image obtained by performing image-capturing on the translucent body with the black backing and the image obtained by performing image-capturing on the translucent body with the white backing. Accordingly, it is possible to form the printed object having the feature amount equivalent to that of the translucent body based on the plurality of reflective images obtained by changing the backing without requiring the transmissive image as in Embodiment 1.

Embodiment 3

In Embodiment 1, explanation has been made on the feature that the feature amount indicative of the ratio between the reflective light and the transmissive light emitted from the object to be reproduced is determined based on the reflective image and the transmissive image, and the amount of the coloring material is determined based on the feature amount. In the present embodiment, explanation will be made on the feature of directly determining the amount of the coloring material based on the reflective image and the transmissive image.

An image processing apparatus of Embodiment 3 is identical to that of Embodiment 1 except that the feature of the determining unit 205 in FIG. 2 is different between Embodiment 1 and Embodiment 3. More specifically, the determining unit 205 does not include the feature amount determining unit 206 and the coloring material amount determining unit 207. A flowchart of processing performed by the image processing apparatus 201 according to Embodiment 3 is identical to the flowchart according to Embodiment 1 except the following point. More specifically, the flowchart according to Embodiment 3 is identical to the flowchart according to Embodiment 1 except that in FIG. 3, processing in steps S304 and S305 is deleted, and processing for calculating the amount of the coloring material based on the reflective image data and the transmissive image data is inserted instead.

Figure 14:
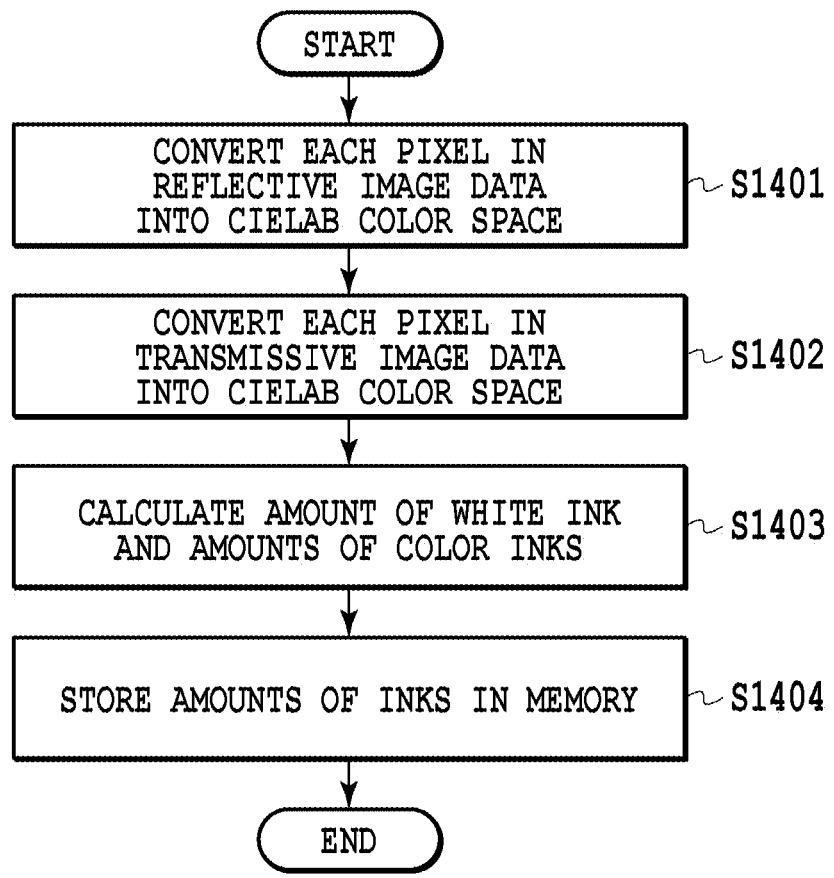
FIG. 14 is a flowchart of processing by a determining unit according to Embodiment 3.

With reference to FIG. 14, explanation will be made below on processing performed by the determining unit 205 to calculate the amount of the coloring material based on the reflective image data and the transmissive image data according to Embodiment 3.

In step S1401, the determining unit 205 converts each pixel of the reflective image into CIELAB values. In the conversion, the formulas (1), (2), and (3) are used. In step S1402, the determining unit 205 converts each pixel of the transmissive image into CIELAB values. In the conversion, the formulas (1), (2), and (3) are used.

In step S1403, the determining unit 205 calculates the amount of the white ink and the amounts of the color inks based on the CIELAB values for the reflective image and the CIELAB values for the transmissive image. In Embodiment 1, the feature amount is firstly calculated from the CIELAB values for the reflective image and the CIELAB values for the transmissive image, and then, the amounts of the inks are successively calculated. In the present embodiment, the amount of each ink is directly determined. In the present embodiment, the data holding unit 208 holds a color conversion LUT shown in FIG. 15. This color conversion LUT is a LUT indicative of a correspondence relationship between the CIELAB values for the reflective image and the transmissive image and the amounts of the inks (W, C, M, Y, and K) for reproducing these CIELAB values, and is a six-dimensional input/five-dimensional output LUT. The color conversion LUT may be prepared beforehand based on the result of changing the amounts of the inks stepwise, outputting the printed object by the image forming unit 209, and making measurements and may be stored in the data holding unit 208. In step S1403, the determining unit 205 performs interpolation calculation with the color conversion LUT, thereby calculating the amount of the white ink and the amounts of the color inks which realize the CIELAB values for the reflective image and the transmissive image. Incidentally, since an existing method may be used for the interpolation calculation, explanation thereof will be omitted.

In step S1404, the determining unit 205 stores, in the memory, the amount of the white ink and the amounts of the color inks for each pixel as calculated in step S1403 together with the CIELAB values for the pixel, and ends the process.

As described above, in Embodiment 3, the data holding unit 208 is configured to hold, as the color conversion LUT, a correspondence relationship between the CIELAB values for the reflective image and the transmissive image of the translucent body and the amount of the white ink and the amounts of the color inks for reproducing the CIELAB values. This makes it possible to directly calculate the amount of the inks necessary for reproducing the translucent body based on the CIELAB values for the reflective image and the transmissive image of the translucent body.

<Variations>

In the above embodiments, descriptions have been given of the examples in which the calculated amount of the white ink is binarized, and printing is performed by using area gradation. In addition to these examples, it is also possible to perform a method for controlling the amount of the white ink for each pixel to control a thickness or form a printed object having a distribution of the ratio between the reflective light and the transmissive light in an image by using a plurality of white inks having different scattering characteristics.

Further, in the embodiments, the feature amount is defined by using the lightness of each image as in the formula (4). However, the feature amount is not limited to this. For example, the feature amount may be defined as follows:

$$S=L_R/L_T \quad \text{Formula (7)}$$

As in the following formulas (8) and (9), the numerator may be the lightness of the transmissive image.

$$S=L_T/(L_R+L_T) \quad \text{Formula (8)}$$

$$S=L_T/L_R \quad \text{Formula (9)}$$

Further, it is also possible to use not the ratio of lightness, but a ratio of the luminance, spectral energy, or the like of the reflective light and the transmissive light. Furthermore, it is possible to define, not the lightness, but a difference between the reflective light and the transmissive light as a feature amount. In this case, a table of correspondence between the feature amount and the white ink may be created according to the definition of the feature amount, and held in the data holding unit 208.

Further, in Embodiment 1, there is shown the example in which the reflective image and the transmissive image are input and in Embodiment 2, there is shown the example in which the black backing image and the white backing image are input. However, the input information is not limited to these. For example, in a case where two or more items such as an image obtained by performing image-capturing under any condition and a ratio of the illumination of the reflective light source and the transmissive light source at the time of capturing the image are input for one object to be reproduced, it is possible to calculate the feature amount. Further, color information equivalent to a hue, chroma, and the like is included in two types of images to be input such as both the reflective image and the transmissive image in Embodiment 1, but it is also possible to use a method in which only information on lightness is included in either one of the reflective image and the transmissive image.

Further, in the embodiments, an RGB image is input as information including reflection and transmission, but the input information is not limited to the RGB image. For example, it is also possible to use a CMYK image, and further, it is also possible to use information such as a distribution of a feature amount created by using computer graphics (CG). As the feature amount, it is possible to use the feature amount indicative of the ratio between the reflective light and the transmissive light as described in the examples, and it is also possible to use reflectivity and transmissivity which can be converted into the ratio between the reflective light and the transmissive light, and hiding power and haze which conform to the JIS. Further, it is also possible to use a combination of the above items.

Further, in the embodiments, explanation has been made by taking CIELAB color space as an example of color space used for color conversion, but the color space is not limited to the CIELAB color space. For example, it is possible to use other color space such as CIE tristimulus values X, Y, and Z or CIELUV. Further, it is needless to say that it is possible to use color perception space for a color appearance model such as CIECAM97, CIECAM97s, or CIECAM02.

Further, in the embodiments, explanation has been made that at least two types of coloring materials are used, and that at least one of the coloring materials includes an achromatic ink having relatively stronger scattering than the other coloring material(s). More specifically, explanation has been made on the example in which the C, M, Y, and K inks and the white ink are used. Further, explanation has been made on the example in which the white ink is used as an ink for controlling the ratio between the reflective light and the transmissive light, but it is also possible to use another ink such as a silver ink.

Further, in the embodiments, for simple explanation, description has been given based on the premise that the scattering characteristics of the color inks are sufficiently small as compared with those of the white ink and do not affect the ratio between the reflective light and the transmissive light. However, it is possible to use color inks which affect the ratio between the reflective light and the transmissive light. In this case, in order to determine the amounts of the inks for obtaining the desired feature amount and color reproduction, it is possible to use a method for previously measuring the feature amount in a case where the white ink and the color inks are mixed, and converting the feature amount into the color conversion LUT.

Further, in the embodiments, explanation has been made that the color inks included in the image forming unit 209 are C, M, Y, and K. For example, it is possible to use the color inks such as R (red), G (green), and B (blue) color inks. Further, it is needless to say that it is possible to use any color inks as light-color inks such as lc (light cyan) and lm (light magenta) color inks. Further, it is naturally possible to use a method for forming an image by previously preparing a plurality of inks according to the calculated feature amount without individually controlling ejection of the above-described multiple color inks.

Further, in the embodiments, description has been mainly made of a method for forming the printed object. However, for example, it is also possible to use a method using, as a display for controlling the appearances of both the transmissive light source and the reflective light source, a filter in which elements capable of controlling the ratio between the reflective light and the transmissive light are arranged in place of the white ink.

Embodiment 4

In Embodiment 4, explanation will be made on processing in a case where the color gamut of the reflective image or the color gamut of the transmissive image goes beyond the scope of color reproduction of the image processing apparatus.

In the present embodiment, the white ink is a coloring material used for controlling the scattering characteristics (light scattering intensity) of the printed object as in Embodiments 1 to 3. As the amount of the white ink becomes larger, the scattering intensity of the printed object becomes higher, and the reflectivity of the printed object becomes higher. On the other hand, as the amount of the white ink becomes smaller, the scattering intensity of the printed object becomes lower, and the transmissivity of the printed object becomes higher. Further, in the present embodiment, the effects of the color inks of four colors C, M, Y, and K on the scattering characteristics of the printed object are extremely small as compared with those of the white ink as in Embodiments 1 to 3, and can be ignored.

Figure 16:
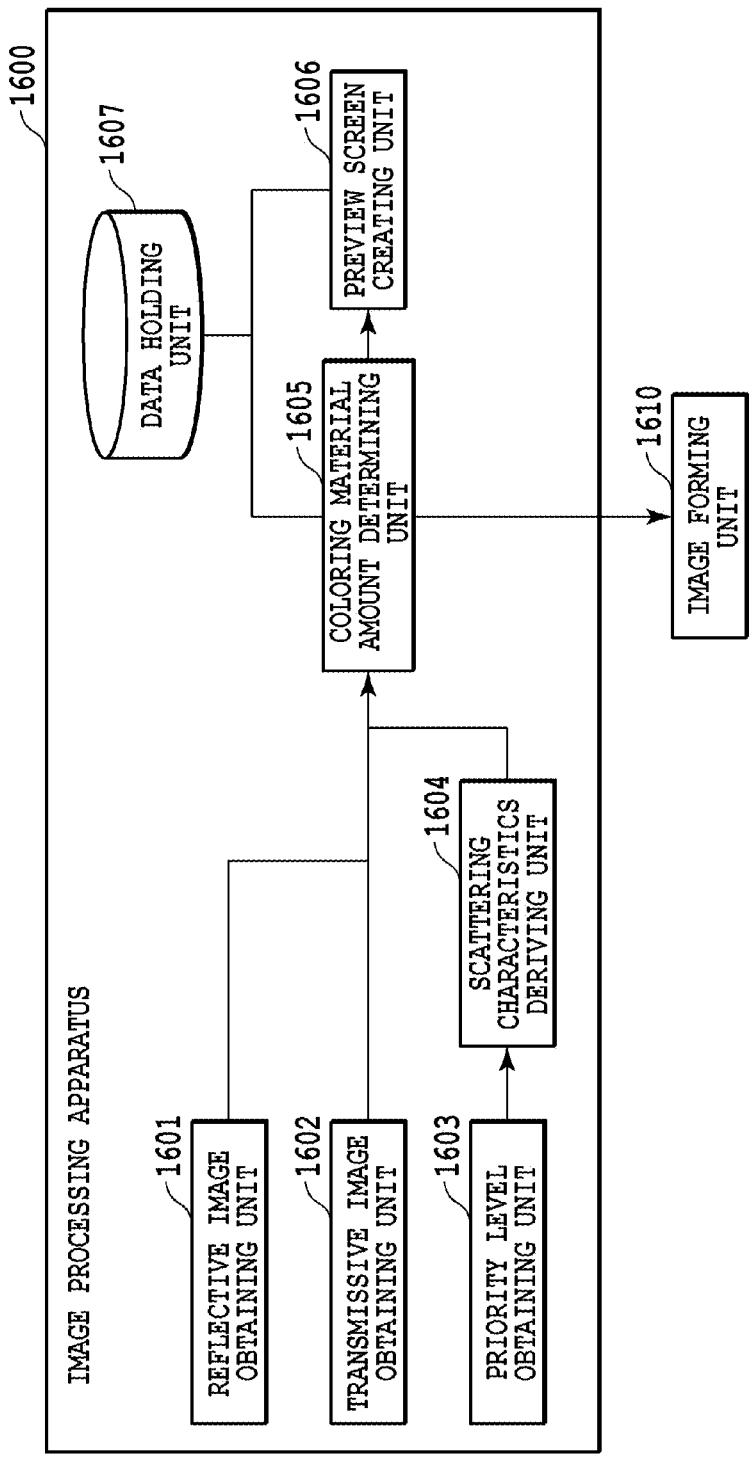
FIG. 16 is a block diagram showing the logical configuration of an image processing apparatus according to Embodiment 4.

FIG. 16 is a block diagram showing the logical configuration of an image processing apparatus 1600 according to the present embodiment. As shown in FIG. 16, the image processing apparatus 1600 includes a reflective image obtaining unit 1601, a transmissive image obtaining unit 1602, a priority level obtaining unit 1603, a scattering characteristics deriving unit 1604, a coloring material amount determining unit 1605, a preview screen creating unit 1606, and a data holding unit 1607.

The reflective image obtaining unit 1601 obtains reflective image data selected by the user, and sends the obtained reflective image data to the coloring material amount determining unit 1605. The reflective image data is the reflective image data obtained by the method explained in Embodiments 1 to 3.

The transmissive image obtaining unit 1602 obtains transmissive image data selected by the user, and sends the obtained transmissive image data to the coloring material amount determining unit 1605. The transmissive image data is the transmissive image data obtained by the method explained in Embodiments 1 to 3.

The priority level obtaining unit 1603 obtains a priority level designated by the user, and sends the obtained priority level to the scattering characteristics deriving unit 1604. The priority level is a parameter for adjusting a degree to which the reflective characteristics of the translucent body and the transmissive characteristics of the translucent body contribute to reproduction of an appearance.

The scattering characteristics deriving unit 1604 derives scattering characteristics necessary for reproducing the appearance of the translucent body based on the priority level sent by the priority level obtaining unit 1603 (the details will be described later), and sends the derived scattering characteristics to the coloring material amount determining unit 1605.

The coloring material amount determining unit 1605 determines the amount of the coloring material based on either of the reflective image data and the transmissive image data and the scattering characteristics (the details will be described later). Print data sent to an image forming unit 1610 by the image processing apparatus 1600 includes data on the amount of the coloring material (hereinafter referred to as the coloring material amount data), and the image forming unit 1610 forms an image on a print medium based on the coloring material amount data. Further, in a case where the user desires a preview display, the coloring material amount determining unit 1605 sends the coloring material amount data to the preview screen creating unit 1606.

The preview screen creating unit 1606 creates a preview screen based on the coloring material amount data sent by the coloring material amount determining unit 1605. This preview screen is an image for showing how the resultant printed object will appear with the reflective light source or the transmissive light source in a case where printing is performed at a present setting. The created preview screen is displayed on the monitor and presented to the user (see FIG. 17).

The data holding unit 1607 holds data such as a lookup table (LUT) used in a case where the coloring material amount determining unit 1605 determines the amount of the coloring material or in a case where the preview screen creating unit 1606 creates the preview screen (the details will be described later).

<User Interface Screen>

Figure 17:
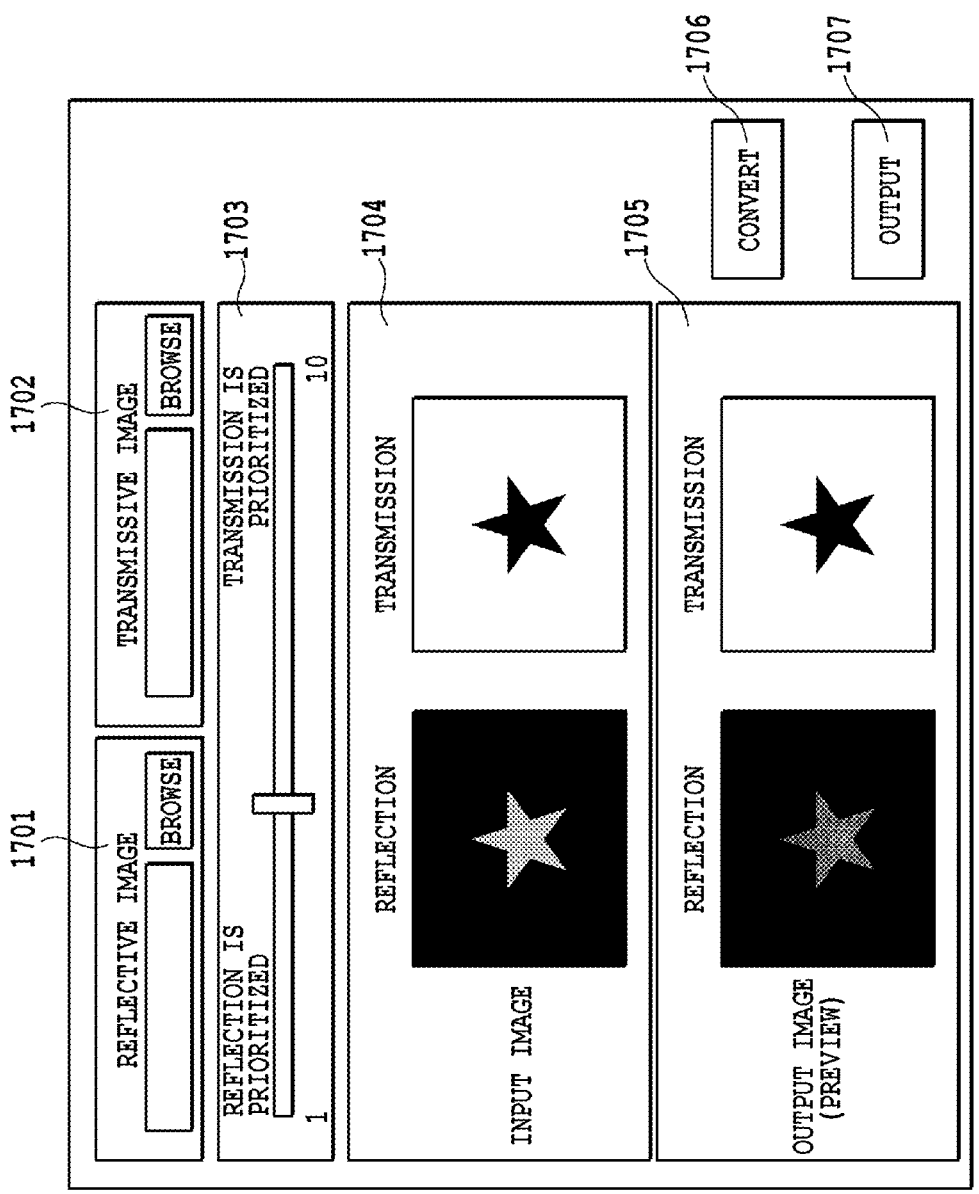
FIG. 17 is a view showing a user interface screen according to Embodiment 4.

FIG. 17 is a view showing an example of a UI screen displayed on the monitor after the image processing application is started. Via this UI screen, the user inputs information necessary for printing.

The UI screen shown in FIG. 17 includes a reflective image input area 1701, a transmissive image input area 1702, a priority level input area 1703, an input image display area 1704, and an output image (preview) display area 1705.

Except for the priority level input area 1703, the above areas are basically the same as the ones shown in FIG. 4.

In the present embodiment, the user designates the priority level by moving a slide bar in the priority level input area 1703. As shown in FIG. 17, in the present embodiment, the priority level takes any integral value in the range of 1 to 10, and as the appearance in the case of using the reflective light source is more prioritized over the appearance in the case of using the transmissive light source, the priority level becomes lower. Incidentally, the priority level explained in the present embodiment is just an example, and the priority level may be values expressed in smaller units, larger units, or percentage, In the output image (preview) display area 1705, there are displayed an image for showing how the printed object will look with the reflective light source in a case where printing is performed at a present setting and an image for showing how the printed object will look with the transmissive light source in a case where printing is performed at the present setting. On this occasion, compression is performed as necessary so that the color gamut of an image to be displayed in the output image (preview) display area 1705 is within the color gamut which can be reproduced by the image processing apparatus. Accordingly, before printing, the user can check whether or not the desired result (printed object) can be obtained by viewing the display in the area.

A convert button 1706 is a button used in a case where the user desires the preview display. After inputting data to the reflective image input area 1701, the transmissive image input area 1702, and the priority level input area 1703, pressing the convert button 1706 triggers execution of processing in the present embodiment. The details of this processing will be described later with reference to FIG. 18.

An output button 1707 is a button used in a case where the user gives an instruction to perform printing and output. In a case where the output button 1707 is pressed, the image forming apparatus starts printing processing.

<Processing Performed by the Image Processing Apparatus>

Figure 18:
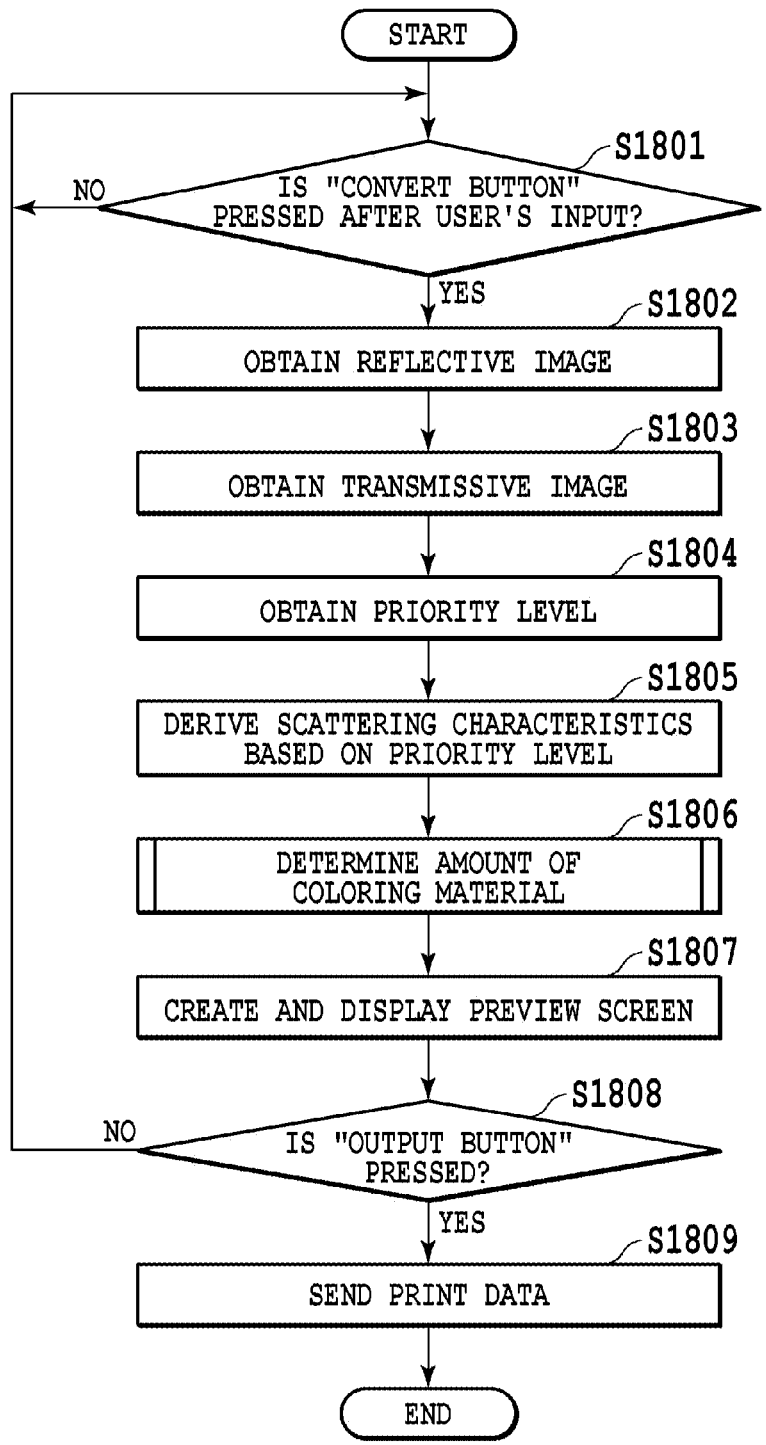
FIG. 18 is a flowchart of processing performed by the image processing apparatus according to Embodiment 4.

FIG. 18 is a flowchart of processing performed by the image processing apparatus 1600 according to the present embodiment. As stated above, after the reflective image and the transmissive image are selected via the UI screen, and the priority level is designated, pressing the convert button 1706 by the user triggers execution of the processing according to the present embodiment.

In step S1801, the CPU determines whether or not the convert button 1706 is pressed after the user's input. As a result of the determination, in a case where the convert button 1706 is pressed, the process proceeds to step S1802. On the other hand, in a case where the convert button 1706 is not pressed, a standby state is maintained until the convert button 1706 is pressed.

In step S1802, the reflective image obtaining unit 1601 obtains the reflective image data selected by the user, and sends the obtained reflective image data to the coloring material amount determining unit 1605.

In step S1803, the transmissive image obtaining unit 1602 obtains the transmissive image data selected by the user, and sends the obtained transmissive image data to the coloring material amount determining unit 1605.

In step S1804, the priority level obtaining unit 1603 obtains the priority level (hereinafter denoted as P) designated by the user, and sends the obtained priority level to the scattering characteristics deriving unit 1604.

In step S1805, the scattering characteristics deriving unit 1604 derives scattering characteristics (hereinafter denoted as S) based on the priority level P, and sends the derived scattering characteristics to the coloring material amount determining unit 1605.

Figure 19A:
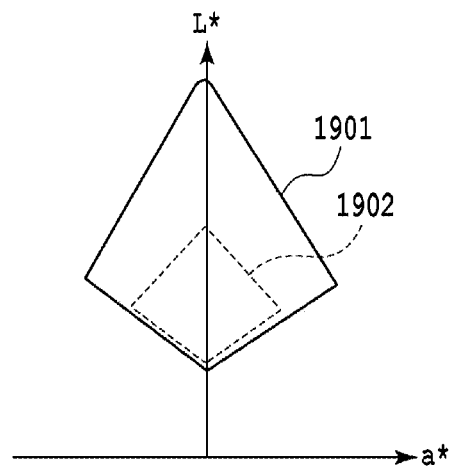
FIGS. 19A and 19B are schematic diagrams showing color gamut which can be reproduced by the image processing apparatus as explained in Embodiment 4.
Figure 19B:
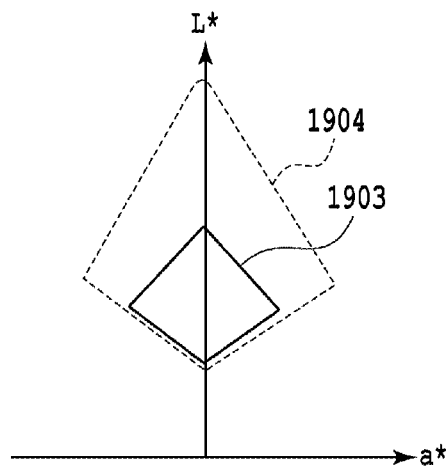

In order to explain a method for deriving the scattering characteristics S, FIGS. 19A and 19B show color gamut which can be reproduced by the image processing apparatus 1600. FIG. 19A is a diagram showing color gamut which can be reproduced by the image processing apparatus 1600 for the printed object observed with the reflective light source. Color gamut 1901 shown by a solid line in FIG. 19A is color gamut which can be reproduced in a case where printing is performed under a condition in which the content of the scatterer (the white ink) is large, and color gamut 1902 shown by a broken line is color gamut which can be reproduced in a case where printing is performed under a condition in which the content of the scatterer is small. In a case where printing is performed under a condition in which the content of the scatterer is large as indicated by the color gamut 1901, the color gamut is wide, and in a case where printing is performed under a condition in which the content of the scatterer is small as indicated by the color gamut 1902, the color gamut is narrow.

FIG. 19B is a diagram showing color gamut which can be reproduced by the image processing apparatus 1600 for the printed object observed with the transmissive light source. Color gamut 1903 shown by a solid line in FIG. 19B is color gamut which can be reproduced in a case where printing is performed under a condition in which the content of the scatterer is large, and color gamut 1904 shown by a broken line is color gamut which can be reproduced in a case where printing is performed under a condition in which the content of the scatterer is small. In a case where printing is performed under a condition in which the content of the scatterer is large as indicated by the color gamut 1903, the color gamut is narrow, and in a case where printing is performed under a condition in which the content of the scatterer is small as indicated by the color gamut 1904, the color gamut is wide.

As disclosed in FIGS. 19A and 19B, there exists a tradeoff relationship between the color gamut which can be reproduced by the image processing apparatus 1600 with the reflective light source and the color gamut which can be reproduced by the image processing apparatus 1600 with the transmissive light source. More specifically, in a case where printing is performed under a condition in which the content of the scatterer is large, the color gamut which can be reproduced with the reflective light source is wide, but the color gamut which can be reproduced with the transmissive light source is narrow. On the other hand, in a case where printing is performed under a condition in which the content of the scatterer is small, the color gamut which can be reproduced with the reflective light source is narrow, and the color gamut which can be reproduced with the transmissive light source is wide.

Accordingly, in the present embodiment, in a case where the reproducibility of the appearance in the case of using the reflective light source is prioritized, printing is performed under a condition in which the content of the white ink, which is the scatterer, is large, and in a case where the reproducibility of the appearance in the case of using the transmissive light source is prioritized, printing is performed under a condition in which the content of the white ink, which is the scatterer, is small. More specifically, in the present embodiment, in a case where the reproducibility of the appearance with the transmissive light source is more prioritized, the priority level becomes higher (see FIG. 17), and accordingly, a monotonous-decrease relationship may be used in the case of obtaining the scattering characteristics S based on the priority level P. For example, the scattering characteristics S are calculated from the priority level P by using the following formula (10).

$$S=1/P \quad \text{Formula (10)}$$

Incidentally, the formula (10) used in the present embodiment to derive the scattering characteristics S is just an example, and as long as there is established a simple-decrease relationship between the priority level P and the scattering characteristics S, another function may be used to calculate the scattering characteristics S.

In step S1806, the coloring material amount determining unit 1605 determines the amount of the coloring material necessary for printing based on the scattering characteristics, and sends the coloring material amount data to the preview screen creating unit 1606. The details of the processing in step S1806 will be described later.

In step S1807, the preview screen creating unit 1606 creates the preview screen based on the coloring material amount data. More specifically, the preview screen creating unit 1606 converts the CMYK values obtained in step S1806 into CIELab values for creating the preview screen in the case of using the reflective light source by using the LUT held in the data holding unit 1607, and converts the CIELab values into sRGB values. Likewise, the preview screen creating unit 1606 converts the CMYK values obtained in step S1806 into CIELab values for creating the preview screen in the case of using the transmissive light source, and converts the CIELab values into sRGB values. The preview screen is created based on these conversions, and the created preview screen is displayed in the output image (preview) display area 1705.

In step S1808, the CPU determines whether or not the user presses the output button 1707. As a result of the determination, in a case where the output button 1707 is pressed, the process proceeds to step S1809. On the other hand, in a case where the output button 1707 is not pressed, the process returns to step S1801.

In step S1809, the image processing apparatus 1600 sends, to the image forming unit 1610, print data including the coloring material amount data created by the coloring material amount determining unit 1605.

<Processing for Determining the Amount of the Coloring Material>

Figure 20:
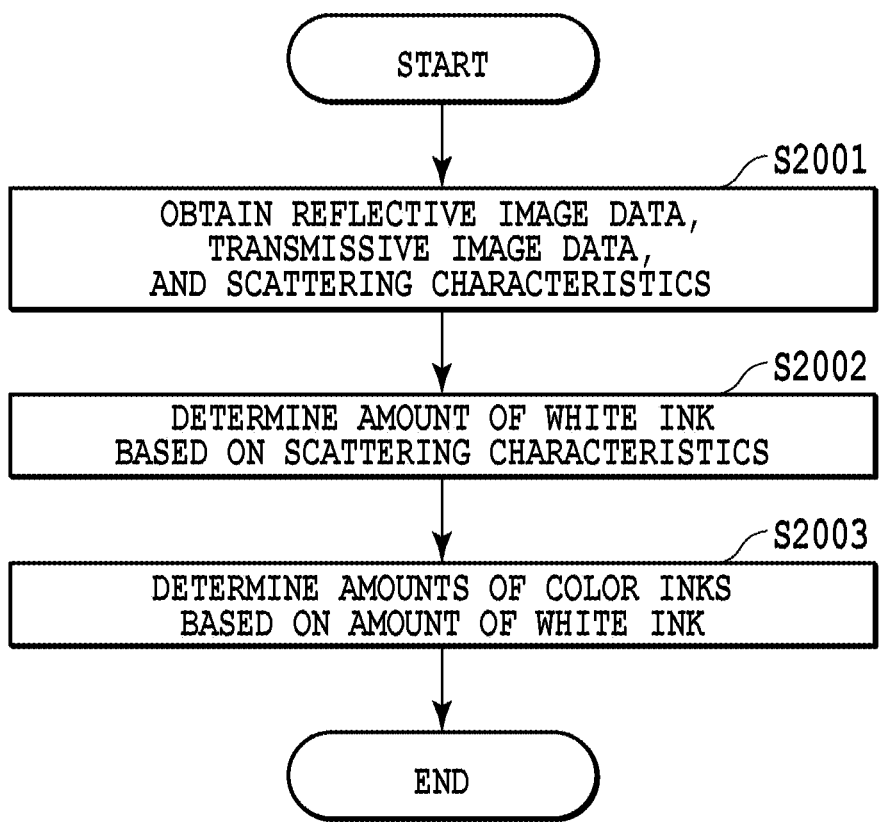
FIG. 20 is a flowchart of processing for determining the amount of a coloring material according to Embodiment 4.

FIG. 20 is a flowchart of the processing (step S1806 in FIG. 18) for determining the amount of the coloring material according to the present embodiment. The processing for determining the amount of the coloring material will be described below in detail with reference to FIG. 20.

In step S2001, the coloring material amount determining unit 1605 obtains the reflective image data, the transmissive image data, and the scattering characteristics S. As described above, the reflective image data and the transmissive image data are image data obtained by capturing an image of the translucent body, and have CIELab values as the pixel values of each pixel.

In step S2002, the coloring material amount determining unit 1605 uses the information held in the data holding unit 1607 to determine the amount of the white ink based on the scattering characteristics obtained in step S2001. In the present embodiment, as shown in FIG. 21A, the data holding unit 1607 holds a graph prescribing a correspondence relationship between the scattering characteristics S and the amount of the white ink W, and the coloring material amount determining unit 1605 uses this graph to obtain the amount of the white ink corresponding to the scattering characteristics. Incidentally, the graph prescribing the correspondence relationship between the scattering characteristics S and the amount of the white ink W is prepared beforehand by performing printing by the image forming unit 1610 under a plurality of conditions in which the amount of the white ink varies, and measuring the resultant printed object, and the prepared graph is held in the data holding unit 1607.

In step S2003, the coloring material amount determining unit 1605 uses the information held in the data holding unit 1607 to determine the amounts of the color inks based on either of the reflective image data and the transmissive image data obtained in step S2001 and the amount of the white ink determined in step S2002. More specifically, in order to determine the amounts of the color inks, the reflective image data is used in a case where the scattering characteristics obtained in step S2001 are ⅕ or more (the priority level is 5 or less) and the transmissive image data is used in a case where the scattering characteristics are ⅙ or less (the priority level is 6 or more). In the present embodiment, as shown in FIGS. 21A and 21B, the data holding unit 1607 holds the color conversion LUT for each allowable amount of the white ink for converting the CIELab values into the CMYK values. Accordingly, the coloring material amount determining unit 1605 uses one of the color conversion LUTs to convert the CIELab values of the reflective image data or the CIELab values of the transmissive image data into the CMYK values, thereby obtaining the amounts of the color inks (the CMYK values for each pixel). In a case where the Lab values before the conversion are not held in the color conversion LUT to be used, it is possible to calculate the CMYK values by using interpolation calculation, and it is possible to use, as an interpolation method, an already-known method such as tetrahedral interpolation or cubic interpolation. Incidentally, the color conversion LUT is prepared beforehand for each amount of the white ink by obtaining each of the amounts of the inks of four colors CMYK (a combination of the color inks) corresponding to the color values (CIELab values) to be reproduced, and the prepared color conversion LUT is held in the data holding unit 1607. It is possible to use any already-known method as a method for preparing the color conversion LUT.

The above is the details of the processing for determining the amount of the coloring material. The data holding unit 1607 may hold, as temporary data, data indicative of the amount of the white ink and the amounts of the color inks for each pixel as determined by the above processing.

As described above, the image processing apparatus of the present embodiment displays the UI screen through which the user can designate the priority level indicating parameters for adjusting a degree of contribution between the reflective characteristics of the translucent body and the transmissive characteristics of the translucent body to the reproduction of the appearance. The image processing apparatus derives the scattering characteristics based on the priority level designated by the user, and derives the amounts of the CMYK color inks and the amount of the white color based on the derived scattering characteristics. Then, the image forming apparatus actually performs printing based on the derived amounts of the color inks and the derived amount of the white ink. Accordingly, in the present embodiment, the user can obtain the printed object which reproduces the appearance of translucent body in the desired priority level.

Further, in the above-described embodiments, explanation has been made on the case of using the CIELab color space as color space which does not depend on a device. However, it is also possible to use color space which does not depend on another device. For example, it is possible to use color space such as CIE tristimulus values X, Y, and Z or CIELUV. Further, it is also possible to use color perception space for a color appearance model such as CIECAM97, CIECAM97s, or CIECAM02.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is possible to suitably reproduce the appearance of the printed object for the translucent body.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2015-064527, filed Mar. 26, 2015, and No. 2015-133864, filed Jul. 2, 2015, which are hereby incorporated by reference wherein in their entirety.

What is claimed is:

1. An image processing apparatus comprising:
a first obtaining unit configured to obtain reflective image data obtained by capturing light, the captured light including surface reflective light reflected from a surface of an object to be reproduced and inner reflective light reflected from the inside of the object to be reproduced;
a second obtaining unit configured to obtain transmissive image data obtained by capturing light transmitted from a back side of the object to be reproduced; and
a determining unit configured to determine an amount of coloring material for each pixel of an image representing the object to be reproduced,
wherein the amount of coloring material is determined as larger as a ratio of a lightness of a reflective image represented by the reflective image data to a lightness of a transmissive image represented by the transmissive image data is higher, and
wherein the coloring material includes ink used for controlling scattering characteristics of the printed object.

2. The image processing apparatus according to claim 1, wherein the first obtaining unit obtains, as the reflective image data, black backing image data on the object to be reproduced, and
the second obtaining unit obtains, as the transmissive image data, image data based on a difference between each pixel in white backing image data on the object to be reproduced and each pixel in the black backing image data.

3. The image processing apparatus according to claim 1, further comprising an image forming unit configured to form an image of the object to be reproduced by using at least two types of coloring materials having different scattering characteristics,
wherein the image forming unit forms the image based on the amount of coloring material determined by the determining unit.

4. The image processing apparatus according to claim 3, wherein the image forming unit forms the image on a medium which is a transparent body or a translucent body.

5. The image processing apparatus according to claim 3, wherein at least one of the coloring materials includes an achromatic ink having relatively stronger scattering than another coloring material.

6. The image processing apparatus according to claim 5, wherein the amount of coloring material for the achromatic ink has a distribution in the formed image.

7. The image processing apparatus according to claim 5, wherein the determining unit
determines a feature amount indicative of a ratio between reflective light and transmissive light emitted from the object to be reproduced based on the reflective image data and the transmissive image data, and
determines the amount of coloring material based on at least one of the reflective image data and the transmissive image data and the feature amount.

8. The image processing apparatus according to claim 7, wherein the feature amount is calculated from any of luminance, lightness, reflectivity, transmissivity, haze, and a contrast ratio in the reflective image data and the transmissive image data or a combination thereof.

9. The image processing apparatus according to claim 7, wherein the determining unit
determines the amount of coloring material for the achromatic ink for each pixel by referring to a table in which the feature amount is associated with the amount of coloring material for the achromatic ink, and
determines the amount of other coloring material by referring to a color conversion table corresponding to the determined amount of coloring material for the achromatic ink.

10. The image processing apparatus according to claim 1, wherein the determining unit determines the amount of coloring material by referring to a table in which information corresponding to the reflective image data and information corresponding to the transmissive image data are associated with the amount of coloring material.

11. An image processing method comprising:
a first obtaining step of obtaining reflective image data obtained by capturing light, the captured light including surface reflective light reflected from a surface of an object to be reproduced and inner reflective light reflected from the inside of the object to be reproduced;

a second obtaining step of obtaining transmissive image data obtained by capturing light transmitted from a back side of the object to be reproduced; and a determining step of determining an amount of coloring material for each pixel of an image representing the object to be reproduced, wherein the amount of coloring material is determined as larger as a ratio of a lightness of a reflective image represented by the reflective image data to a lightness of a transmissive image represented by the transmissive image data is higher, and wherein the coloring material includes ink used for controlling scattering characteristics of the printed object.

12. A non-transitory computer readable storage medium storing a program which causes a computer to perform an information processing method comprising:

a first obtaining step of obtaining reflective image data obtained by capturing light, the captured light including surface reflective light reflected from a surface of an object to be reproduced and inner reflective light reflected from the inside of the object to be reproduced;

a second obtaining step of obtaining transmissive image data obtained by capturing light transmitted from a back side of the object to be reproduced; and a determining step of determining an amount of coloring material for each pixel of an image representing the object to be reproduced, wherein the amount of coloring material is determined as larger as a ratio of a lightness of a reflective image represented by the reflective image data to a lightness of a transmissive image represented by the transmissive image data is higher, and wherein the coloring material includes ink used for controlling scattering characteristics of the printed object.

13. The image processing apparatus according to claim 1, further comprising:

a priority level obtaining unit configured to obtain a priority level for adjusting a degree of contribution between the reflective characteristics and the transmissive characteristics to reproduction of an appearance of the object to be reproduced; and a coloring material amount determining unit configured to determine an amount of coloring material for each pixel based on reflective image data obtained by capturing an image of the object to be reproduced with a reflective light source, transmissive image data obtained by capturing an image of the object to be reproduced with a transmissive light source, and the obtained priority level.

14. The image processing apparatus according to claim 13, wherein the amount of coloring material includes an amount of color ink used for controlling a color of a printed object and an amount of white ink used for controlling scattering characteristics of the printed object.

15. The image processing apparatus according to claim 14, further comprising:

a deriving unit configured to derive scattering characteristics of the printed object based on the priority level; and a data holding unit configured to hold a graph prescribing a correspondence relationship between the scattering characteristics and the amount of white ink, wherein the coloring material amount determining unit determines the amount of white ink corresponding to the derived scattering characteristics by using the graph, and determines the amount of color ink for each pixel based on the determined amount of white ink and either of the reflective image data and the transmissive image data.

16. The image processing apparatus according to claim 13, further comprising a preview screen creating unit configured to create a preview screen based on the determined amount of coloring material for each pixel.

17. The image processing apparatus according to claim 13, further comprising a displaying unit configured to display a user interface screen having a slide bar for designating the priority level.

18. The image processing apparatus according to claim 13, wherein the object is a translucent body.

19. The image processing apparatus according to claim 1, further comprising a ratio determining unit configured to determine ratio between lightness of the transmissive image and the lightness of the reflective image, wherein the determining determines the amount of coloring material based on the ratio.

20. The image processing apparatus according to claim 19, wherein the amount of coloring material includes an amount of color ink used for controlling a color of a printed object and an amount of white ink used for controlling scattering characteristics of the printed object.

21. The image processing apparatus according to claim 20, wherein the determining unit determines the amounts of color ink by referring to one of a plurality of color conversion tables corresponding to each amount of the white ink.

* * * * *